United States Patent
Hoarty et al.

(10) Patent No.: US 12,114,002 B2
(45) Date of Patent: Oct. 8, 2024

(54) EMBEDDING VIDEO WATERMARKS WITHOUT VISIBLE IMPAIRMENTS

(71) Applicant: INSCAPE DATA, INC., Irvine, CA (US)

(72) Inventors: W. Leo Hoarty, Morgan Hill, CA (US); Kyoungsoo Moon, Irvine, CA (US); Brian Reed, Stamford, CT (US); Zeev Neumeier, Berkeley, CA (US)

(73) Assignee: INSCAPE DATA, INC., Irvine, CA (US)

( * ) Notice: Subject to any disclaimer, the term of this patent is extended or adjusted under 35 U.S.C. 154(b) by 102 days.

(21) Appl. No.: 17/359,335

(22) Filed: Jun. 25, 2021

(65) Prior Publication Data

US 2021/0400296 A1    Dec. 23, 2021

Related U.S. Application Data

(63) Continuation of application No. 16/404,685, filed on May 6, 2019, now Pat. No. 11,082,710, which is a
(Continued)

(51) Int. Cl.
*H04N 19/467* (2014.01)
*G06T 1/00* (2006.01)
*H04N 1/32* (2006.01)

(52) U.S. Cl.
CPC ......... *H04N 19/467* (2014.11); *G06T 1/0028* (2013.01); *H04N 1/32309* (2013.01); *G06T 2201/0051* (2013.01); *G06T 2201/0053* (2013.01); *G06T 2201/0061* (2013.01); *G06T 2201/0083* (2013.01)

(58) Field of Classification Search
None
See application file for complete search history.

(56) References Cited

U.S. PATENT DOCUMENTS 6,222,932 B1 * 4/2001 Rao ................. G06T 1/0092
380/54
7,154,560 B1   12/2006 Chang
(Continued)

FOREIGN PATENT DOCUMENTS

GB        2526148        11/2015

OTHER PUBLICATIONS

IN2153DE2006A Method and system for creating digital content to reconstruct a video frame, English ; Anurag Goel et al. Earliest Priority Date: Sep. 28, 2006 (Year: 2006).
(Continued)

*Primary Examiner* — Nancy Bitar
(74) *Attorney, Agent, or Firm* — POLSINELLI LLP

(57) ABSTRACT

Methods, devices, and computer-program products are provided for adding and decoding data to a digital video signal in a visually imperceptible manner. For example, an encoded video frame can be obtained, and one or more blocks of the encoded video frame can be decoded. Binary data can be added to a subset of pixels from a set of pixels of the one or more blocks. For instance, a pixel component can be modulated to add the binary data. The one or more blocks can be re-encoded using at least one coding mode. The re-encoded one or more blocks can be added to the encoded video frame.

20 Claims, 19 Drawing Sheets

Related U.S. Application Data continuation-in-part of application No. 15/704,242, filed on Sep. 14, 2017, now Pat. No. 10,360,651.

(60) Provisional application No. 62/394,390, filed on Sep. 14, 2016.

(56) References Cited

U.S. PATENT DOCUMENTS

| | | | |
|---|---|---|---|
| 7,197,164 B2 | 3/2007 | Levy | |
| 8,861,922 B2 | 10/2014 | Zarrabizadeh | |
| 9,877,024 B2 * | 1/2018 | Chong | H04N 19/82 |
| 9,922,390 B2 | 3/2018 | Beaubien | |
| 10,313,692 B2 | 6/2019 | Liu | |
| 10,360,651 B1 | 7/2019 | Hoarty | |
| 11,082,710 B2 | 8/2021 | Hoarty | |
| 11,132,758 B2 | 9/2021 | Hoarty | |
| 2004/0234098 A1 * | 11/2004 | Reed | G06T 1/0042 |
| | | | 382/100 |
| 2005/0069168 A1 | 3/2005 | Zarrabizadeh | |
| 2011/0142348 A1 * | 6/2011 | Radhakrishnan | G06T 1/0085 |
| | | | 382/195 |
| 2013/0188824 A1 * | 7/2013 | Hou | H04N 1/32251 |
| | | | 382/100 |
| 2014/0147041 A1 | 5/2014 | Brown | |
| 2015/0324948 A1 | 11/2015 | Cain | |
| 2016/0261874 A1 * | 9/2016 | Chong | H04N 19/117 |
| 2017/0026600 A1 | 1/2017 | Noh | |
| 2018/0253826 A1 | 9/2018 | Milanfar | |
| 2019/0261012 A1 * | 8/2019 | Hoarty | H04N 19/467 |
| 2019/0295209 A1 * | 9/2019 | Kodama | G06T 1/20 |
| 2019/0306480 A1 | 10/2019 | Talagala | |
| 2019/0347956 A1 | 11/2019 | Daga | |

OTHER PUBLICATIONS

Non-Final Office Action of Sep. 19, 2018 for U.S. Appl. No. 15/704,242; 7 pages.

Notice of Allowance of Mar. 11, 2019 for U.S. Appl. No. 15/704,242; 9 pages.

Non-Final Office Action of Nov. 24, 2020 for U.S. Appl. No. 16/404,685; 8 pages.

Notice of Allowance of Apr. 26, 2021 for U.S. Appl. No. 16/404,685; 10 pages.

Non-Final Office Action of Mar. 19, 2020 for U.S. Appl. No. 16/436,600; 10 pages.

Final Office Action of Sep. 30, 2020 for U.S. Appl. No. 16/436,600; 10 pages.

Non-Final Office Action of Dec. 24, 2020 for U.S. Appl. No. 16/436,600; 9 pages.

Notice of Allowance of May 26, 2021 for U.S. Appl. No. 16/436,600; 9 pages.

* cited by examiner

| I | I | I | I | I | I | I |
|---|---|---|---|---|---|---|
| I | B | B | B | P | B | B |

Top row of macroblocks always I-type 402

Hypothetical GOP 403

FIG. 4

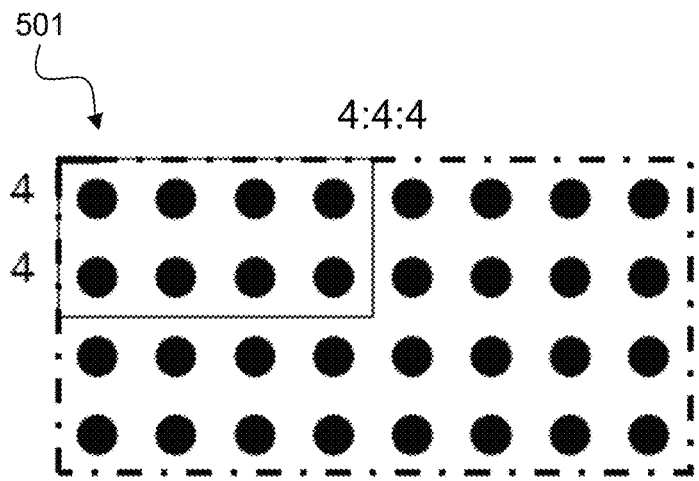
FIG. 5A
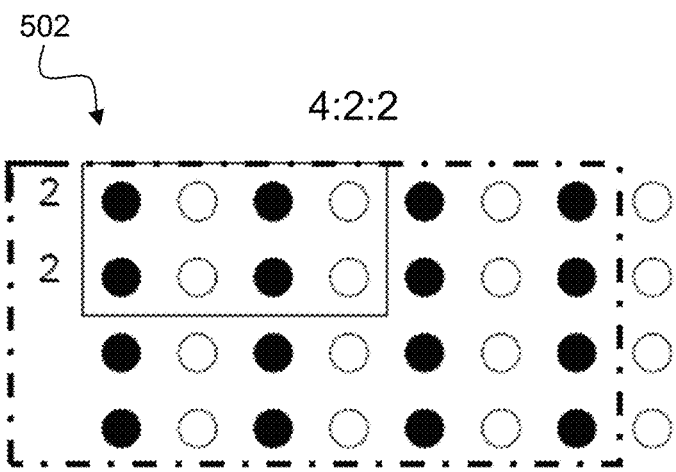
FIG. 5B
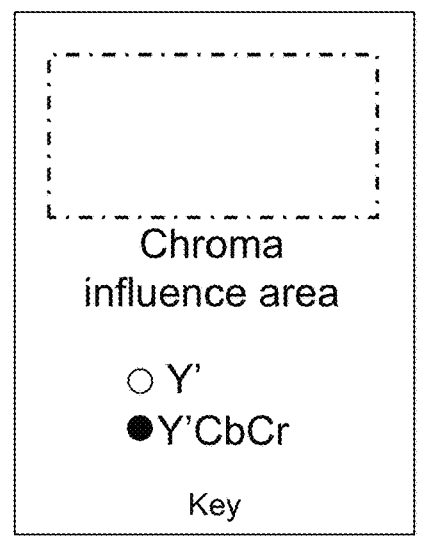

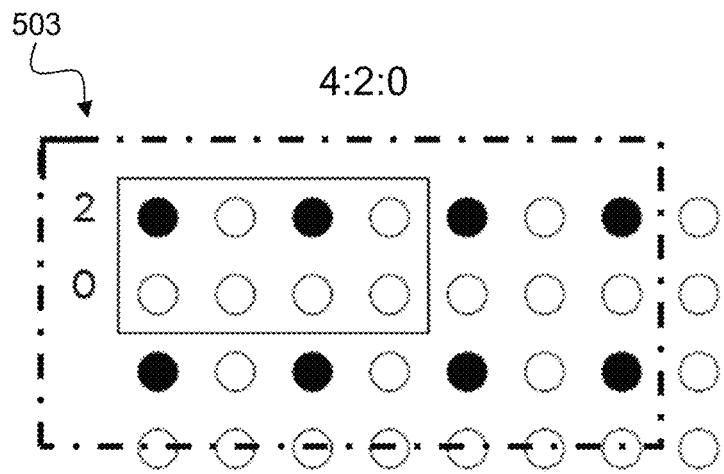
FIG. 5C
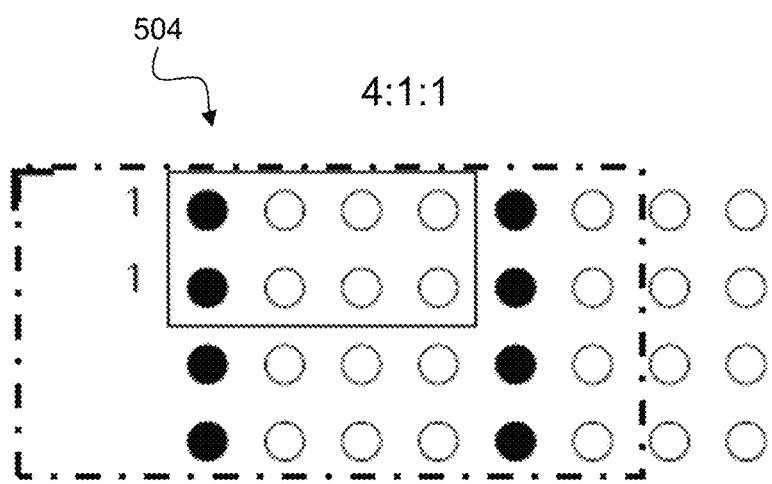
FIG. 5D
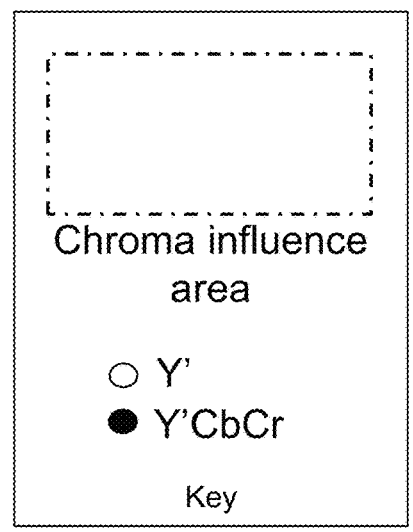

EMBEDDING VIDEO WATERMARKS WITHOUT VISIBLE IMPAIRMENTS

CROSS-REFERENCE TO RELATED APPLICATIONS

This application is a continuation of U.S. patent application Ser. No. 16/404,685, filed May 6, 2019, which is a continuation-in-part of U.S. application Ser. No. 15/704,242, filed Sep. 14, 2017, which claims the benefit of and priority to U.S. Provisional Patent Application No. 62/394,390, filed Sep. 14, 2016, the contents of which are hereby expressly incorporated by reference in their entirety.

FIELD

This application is generally related to embedding data into a digital video signal without visually impairing the signal, in order to provide a means for conveying additional information with the video signal.

BACKGROUND

Watermarking includes embedding data in digital video content to enable a media device to extract the embedded data from the video (e.g., being displayed). While certain standards (e.g., the Advanced Television Systems Committee (ATSC) A/335 standard) may support a video watermark, the data would be slightly or even highly visible in the displayed content, and therefore may lead to viewer complaints if widely used. Hence, there is a need for a better solution for video watermarking.

SUMMARY

This application relates generally to systems and techniques for embedding data into a digital video signal without visually impairing the signal, in order to provide a means for conveying additional information with the video signal. For example, the systems and techniques can embed (and hide) the data within a certain number of top rows, a certain number of bottom rows, a certain number of left columns, and/or a certain number of right columns of pixels in the video data (e.g., in a video frame). The additional information can be related to the video in which the data is embedded, can be used to trigger the substitution of alternate content to a viewer of the video, and/or can provide other information. The embedded data can also be quickly decoded by a media device or other device with video decoding capabilities.

According to at least one example, a method of processing video data is provided. The method includes obtaining an encoded video frame. The method further includes decoding one or more blocks of the encoded video frame. The method further includes adding binary data to a subset of pixels from a set of pixels of the one or more blocks. The method further includes re-encoding the one or more blocks using at least one coding mode. The method further includes adding the re-encoded one or more blocks to the encoded video frame.

In another example, an apparatus for processing video data is provided that comprises one or more processors and a non-transitory machine-readable storage medium containing instructions, which when executed on the one or more processors, cause the one or more processors to perform operations including: obtaining an encoded video frame; decoding one or more blocks of the encoded video frame; adding binary data to a subset of pixels from a set of pixels of the one or more blocks; re-encoding the one or more blocks using at least one coding mode; and adding the re-encoded one or more blocks to the encoded video frame.

In another example, a non-transitory computer-readable medium is provided that has stored thereon instructions that, when executed by one or more processors, cause the one or more processor to: obtain an encoded video frame; decode one or more blocks of the encoded video frame; add binary data to a subset of pixels from a set of pixels of the one or more blocks; re-encoding the one or more blocks using at least one coding mode; and add the re-encoded one or more blocks to the encoded video frame.

In another example, an apparatus for processing video data is provided. The apparatus includes means for obtaining an encoded video frame. The apparatus further includes means for decoding one or more blocks of the encoded video frame. The apparatus further includes means for adding binary data to a subset of pixels from a set of pixels of the one or more blocks. The apparatus further includes means for re-encoding the one or more blocks using at least one coding mode. The apparatus further includes means for adding the re-encoded one or more blocks to the encoded video frame.

In some aspects, the one or more blocks include a top row of blocks of the encoded video frame.

In some aspects, the subset of pixels of the one or more blocks includes at least a top row of pixels of the one or more blocks.

In some aspects, the subset of pixels of the one or more blocks includes a top two rows of pixels of the one or more blocks.

In some aspects, adding the binary data to the subset of pixels of the one or more blocks includes: modulating at least one color-difference component of a pixel of the subset of pixels, where the at least one modulated color-difference component represents at least one binary value. In some examples, the at least one color-difference component includes at least one of a chroma-blue color-difference component or a chroma-red color-difference component. In some examples, the luma component of the pixel is not modulated. In some examples, the luma component of the pixel is modulated, and a color-difference component is not modulated.

In some aspects, the methods, apparatuses, and computer-readable medium described above for processing video data further comprise: modifying a subsampling format of the decoded one or more blocks to increase an amount of chrominance information in the decoded one or more blocks. In some examples, the subsampling format is modified from a 4:2:0 subsampling format to a 4:2:2 subsampling format. In some examples, the subsampling format is modified from a 4:2:2 subsampling format to a 4:4:4 subsampling format. In some examples, the subsampling format is modified from a 4:1:1 subsampling format to a 4:2:2 subsampling format. In some examples, the subsampling format is modified from a 4:1:1 subsampling format to a 4:2:0 subsampling format.

In some aspects, re-encoding the one or more blocks using at least one coding mode includes: defining a first coding mode for a top portion of the one or more blocks; defining a second coding mode for a bottom portion of the one or more blocks; re-encoding the top portion of the one or more blocks using the first coding mode; and re-encoding the bottom portion of the one or more blocks using the second coding mode.

In some aspects, the apparatus comprises one or more of a camera, a computer, a mobile device, a broadcast receiver device, and/or a set-top box. In some cases, the apparatus comprises a display device (e.g., a television, a mobile device, a tablet computer, a personal computer, or other display device) configured to display the video data (e.g., a decoded version of the encoded video frame).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing:

FIG. 4 is a diagram illustrating the top row of re-encoded blocks encased in an intra-prediction frame type slice layer per frame regardless of underlying frame type, in accordance with some examples provided herein;

FIG. 5A-FIG. 5D are diagrams illustrating subsampling formats of 4:4:4, 4:2:2, 4:2:0, and 4:1:1, in accordance with some examples provided herein;

DETAILED DESCRIPTION

Figure 1:
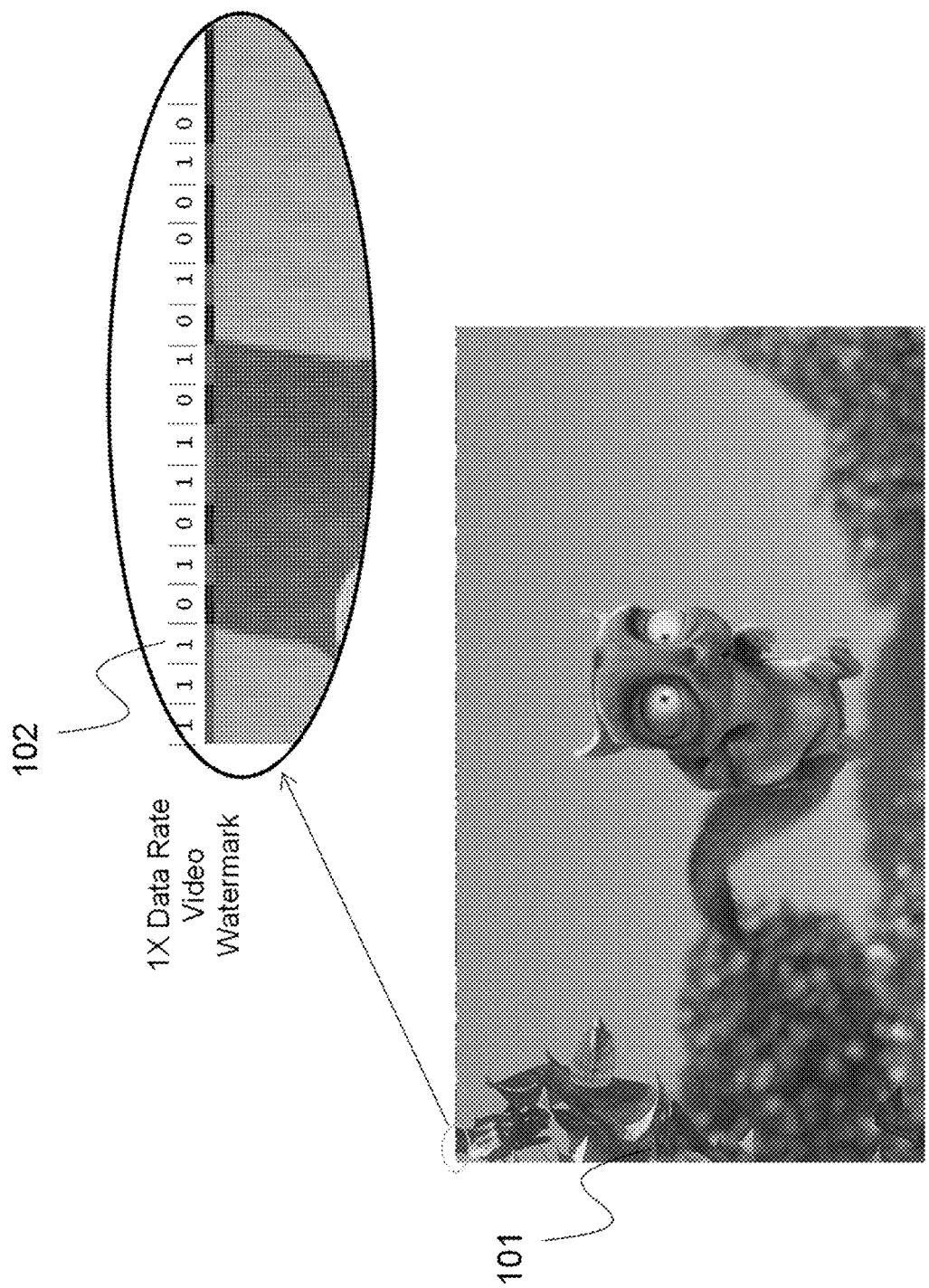
FIG. 1 is a diagram illustrating a graphic from the ATSC Video Watermark Standard A/335 showing a video frame with data embedded in the top lines of the display using a specified two-level watermark standard.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

This application relates generally to embedding data into a digital video signal without visually impairing the signal in order to provide a means for conveying additional information that is typically related to the video in which the data is embedded, or triggering the substitution of alternate content to the viewer.

"Watermarking" can be added to digital video content in such a way that the displayed video is not altered in a perceptually noticeable manner, yet still enables the receiving device (e.g., a television system, set-top box, mobile device, computer, or other receiving device) to extract data embedded in the video being displayed. "Digital watermarking" is a term that originally described a technique for hiding certain identification data regarding the origin of a digital media stream. Digital watermarks were embedded in an image file or video frames in a way that inhibited their removal without also destroying the underlying content. When such watermarked digital content is distributed online or recorded on media, the data reflecting the content's origination travels with it, which enables the originator to demonstrate the source and possible ownership of the content. Digital watermarking can also be used for triggering events (e.g., for interactive television) as well as for dynamic content substitution.

In the original cathode ray tube (CRT)-based television sets common in the analog TV era, a displayed image was transmitted in rows of lines in which black to white (and later color) were displayed as it was projected onto the phosphors coating the inside of the CRT. These lines were repeated as interlaced frames where the frames were separated by a few dozen lines which did not display, and were therefore called the "vertical blanking interval" or VBI. The VBI was used to allow the CRT to move its beam from the bottom scan back to the top and settle down before beginning the scan of another frame of video.

Technologies that embedded information in the VBI lines were developed. Some of the more common uses included closed-captioning text for the hearing impaired, as well as train schedules for videotext display. However, with the advent of digital televisions, there was no need for a VBI since the modern digital television standard includes a separate data stream interwoven with the audio and video data. However, this existing data path is not accessible to a receiving device that is connected to a cable or satellite set-top box, and so alternative approaches for inserting additional information have been proposed.

The committee that developed the current digital television standards is called the Advanced Television Standards Committee, or ATSC, which has devised three generations of its various standards since the launch of digital TV in 2006. ATSC is comprehensive and accounts for a wide variety of uses of a digital television signal extending to non-television set devices such as mobile phones and tablets. In addition to audio and video data, the standard also provides a data path for control and metadata information that is not directly displayed. This information includes details about the program, its episode number, its actors, director, etc. The standard further incorporates information in this embedded data path such as closed-captioned text for the hearing impaired. The standard provides far more flexibility in conveying data to a television receiver than what the now obsolete analog television standard's vertical blanking interval could have ever provided.

Despite the extensive capability for conveying data signals to a television system, the ATSC committee also devised and publish a video and audio watermarking system. This was in recognition of the fact the data channel of the digital TV signal is not synchronized closely enough for triggering very time-sensitive events inside a receiving set-top box or network-connected television (TV) (or so-called "smart TV"), such as pop-up data windows providing additional information about a product being displayed. An even more precise timing requirement would be needed for alternative content substitution where the alternative content might be cached locally in a TV set-top box, smart TV, or other receiving device. In this mode, the receiving device can continuously search the displaying video for the presence of a watermark signal in the appropriate locations and when found, decode the signal. If the conditions are correct, the receiving device can stop displaying the current video information, and can substitute the locally-stored video information; substituting one set of content for another set of alternative content.

In the most recent standard released in 2018, the ATSC, committee published a video watermarking standard, A/335, which employs the top two lines of the video frame to carry data. For example, a digital watermark can be embedded on the top lines (e.g., the top two lines) of a video frame. FIG. 1 is a diagram from the ATSC Video Watermark Standard A/335 showing a video frame 101 with data 102 embedded in the top lines of the display using the specified two-level watermark standard. Such an approach is reliant on television displays continuing to employ what is known in the industry as overscan. Overscan is where the video frame is made larger than the display area such that the top and bottom few lines of video are not displayed forming a quasi-vertical blanking interval. For example, the committee relied on the fact that most high-definition televisions (HDTVs) employed overscan (where the top and bottom few lines of video were off-screen), somewhat of a throw-back to the NTSC analog TV days of the VBI. Because in overscan the top few lines are not displayed, the data added to the top lines of a video frame is not visible when the video frame is displayed. A shortcoming of this approach is that a significant percentage of contemporary television sets no longer apply overscan to the video frame. For example, most TV brands in service today do not overscan, especially the latest 4K TVs, since it was noted that overscan reduced sharpness by slightly enlarging the video frame and one of the benefits of the high resolution 4K displays focuses on perceived sharpness. Without overscan, the watermark data embedded in the top two lines of the video frame can be visible (e.g., as a flickering signal as video frames are displayed). The flickering signal of the embedded data can be distracting or annoying to a viewer.

However, that proposed watermarking approach from ATSC A/335 has not been adopted in practice for numerous reasons, one being that the additional information creates on-screen artifacts that are visible to the viewer (e.g., based on the overscan issue noted above), So, while the ATSC A/335 standard supports a video watermark, it would be slightly or even very visible to the human eye, and therefore likely lead to viewer complaints if widely used. Another limitation of the ATSC media watermarking standard, A/335, is that the audio watermarking takes too long to decode to use for a media substitution signal when intended to be used, for example, to trigger the dynamic content substitution feature for providing alternative content, as described above. As noted above, the video watermark standard also suffers from the fact that it is now often visible at the top of the display. There is a need for a better solution for video watermarking that provides embedded or additional data in the video data, but without being perceptible by the human eye when viewing the video data.

Systems, apparatuses, methods, and computer-readable media are described herein for providing a watermarking approach that can embed digital data directly onto a digital image in such a manner as to enable the data to be rapidly decoded, yet still be invisible to the human eye. For example, the techniques described herein can embed additional into an original video data stream in such a manner that it remains imperceptible to the viewer, yet it can provide the CPU, or other information processing apparatus in a receiving device, with additional information about the specific content running at that moment. As used here, a receiving device can include any device that can receive, process, and/or display video data. For example, a receiving device can include a display device (e.g., a television, a network-connected or smart television, a mobile device, a computer, a tablet computer, a head-mounted display (HMD) for virtual reality content, a heads-up display (HUD), or other suitable display device), a video processing device (e.g., a set-top box, a computer, a server, or other suitable video processing device), or other receiving device. In some cases, the receiving device can process the video data and display the video data (e.g., in the case of a smart TV). In some cases, the receiving device can receive and process the video data (e.g., a set-top box, a server, or the like), and can provide the processed video data to another receiving device (e.g., a mobile device, smart television, or the like).

The additional information added to the video stream might include, by way of example only and without limitation, background information on the displayed video, commercial messages associated with the video content being displayed at that moment. Other uses of the additional data include providing a trigger signal at the start of a television commercial to allow the receiving device to detect the signal and substitute an advertisement stored locally in the receiving device memory, or display video information from a server source on the Internet or other network.

In some implementations, the techniques described herein can improve on the ATSC A/335 standard by providing a means to hide a data signal (carrying additional data) within the top and/or bottom two rows of pixels in the video data in a manner such that the additional data can carry sufficient information for a variety of uses and can also be rapidly decoded. Such a solution enables the additional data to be useful for triggering tightly-timed events within a receiving system (e.g., dynamic content substitution, or other use).

The techniques described herein can add the additional data to the video by utilizing one or more rows of the pixels at the top and/or bottom of the video frame. While examples are described herein using one or more rows of pixels at the top and/or bottom of the video frame, one of ordinary skill will appreciate that, in some implementations, one or more columns of pixels at the right and/or left side of the video frame can be used to convey data as described herein. It is through novel applications of colorimetry and other processes that the data is embedded in the top and/or bottom edges of the visible portion of a video frame, allowing a receiving device to quickly and accurately decode the additional data for a variety of useful applications without being visible to the viewer. For example, to add the additional information, the color information of the top and/or bottom one or more rows of pixels (or the right and/or left one or more columns) can be modified by adjusting one or more color-difference components (e.g., chrominance-blue Cb difference signal and/or chrominance-red Cr difference signal) of the pixels (but not their luminance (Y) in some cases), thus rendering the changes imperceptible to the viewer, yet capable of carrying data. In some implementations, the luminance component of a pixel can be adjusted, in addition to or as an alternative to one or more of the color-difference components of the pixel.

For example, a watermarking application (in combination with one or more processors or other component) of the receiving device can embed a digital code (e.g., a numeric code, such as one or more 0s or 1s) into a video frame. In some cases, the digital code can be embedded into the video frame by altering groups of pixels by shifting the hue of the pixels (e.g., by modulating the color-different components), but not their brightness (e.g., the luminance components). It is well known in the study of human visual perception that the eye is very sensitive to changes in the brightness of a picture, but less sensitive to the absolute color. Accordingly, when a digital video source is compressed (using a video coding/compression technique) for transmission or distribution to a television receiver, the black and white information (e.g., the luminance) receive most of the code space, while color hue and color saturation share the remainder. The watermarking application takes advantage of the relatively lower sensitivity of the eye to color signals, in order to alter the color signal in a manner that can be digitally detected by a decoding system, while not being visible to the human eye when displayed.

To embed digital data into a video frame and then to decode it easily in a receiving device, in one illustrative example, the watermarking application can apply watermarking per symbol size (e.g., symbol size as used in the ATSC A/335 standard) by modulating the Cb and/or Cr signal (or component) in such a way that the data carrying symbols are not visible to the person viewing the content (e.g., TV programming) containing the application's watermarks. A symbol (also referred to as a code) can include a 0 or a 1 in some cases, where the 0 indicates one piece of data and a 1 indicates another piece of data. In some cases, a symbol (or code) can be a combination of multiple 0s and/or 1s.

Techniques are described below for encoding the video watermark with the parallel goal of also surviving at least one re-encoding, which in some cases can be assumed to take place somewhere along the distribution of the video programming from its source through the multi-channel video programming distributor's (MVPD) network, whether terrestrial, satellite, or other type of distribution. Before going into details, and to better describe the process of color shifting in a minimally visible manner, a few principles of color space and the many variants will be described.

First, a background of the HSL (hue, saturation, lightness) and HSV (hue, saturation, value) color spaces will be described. HSL and HSV are alternative representations of the RGB color model. Contemporary color space models were designed in the 1970s by the computer graphics industry to more closely align with the way human vision perceives color attributes. In these models, colors of each hue are arranged in a radial slice, around a central axis of neutral colors which ranges from black at the bottom to white at the top. The HSL color space models the way physical paint in different colors mix together, with the saturation dimension resembling various shades of brightly colored paint, and the lightness dimension resembling the mixture of those paints with varying amounts of black or white paint. The HSL model attempts to resemble more perceptual color models such as the Natural Color System (NCS) or Munsell color system, placing fully-saturated colors around a circle at a lightness value of one-half, where a lightness value of 0 or 1 is fully black or white, respectively.

Figures 7A, 7B:
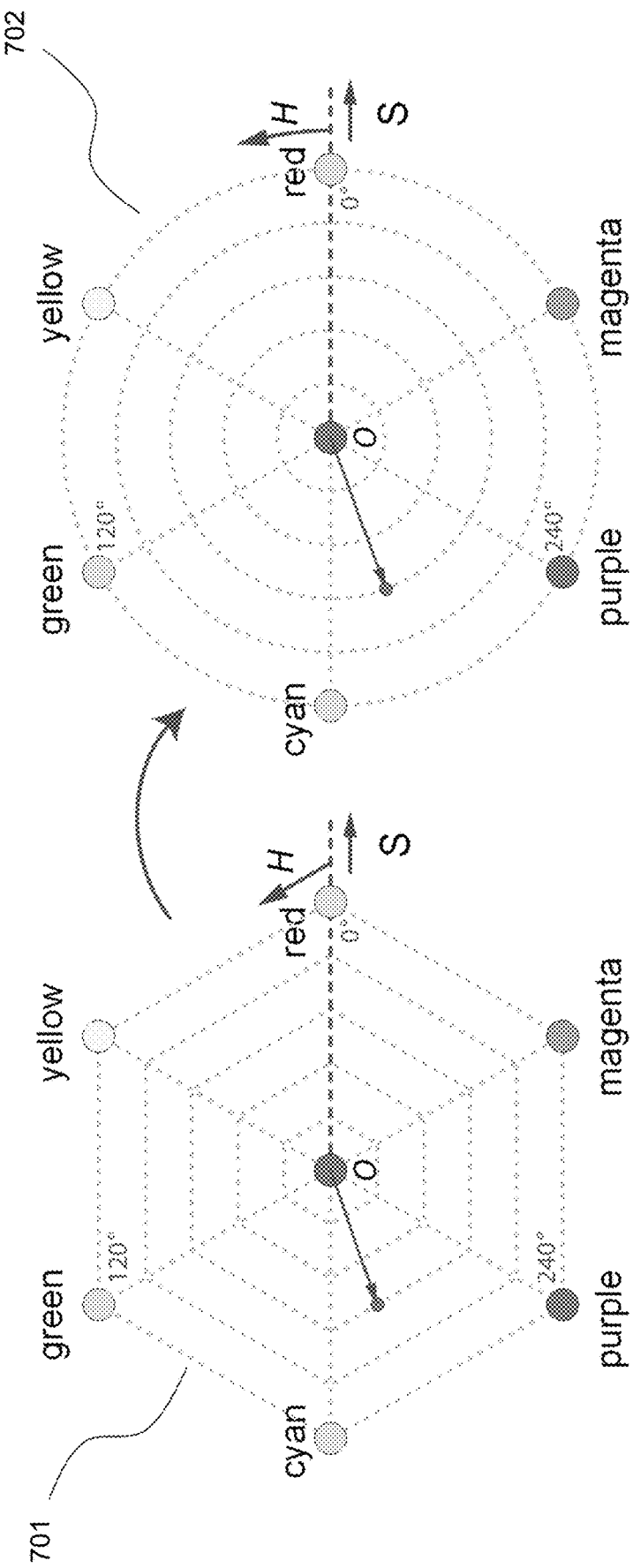
FIG. 7A and FIG. 7B are diagrams illustrating the effect of the mathematical representation of the hue, saturation, and lightness (HSL) color representation, in accordance with some examples provided herein.

The principle of the HSL and HSV color spaces will now be described. FIG. 7A and FIG. 7B are diagrams illustrating the effect of the mathematical representation of HSL transforming the hexagonal representation 701 of the color space into a circular representation 702. As shown in FIG. 8A, HSL (represented by cylinder 801) is a cylindrical geometry. HSV is also a cylindrical geometry. With reference to FIG. 8A, hue 803 (the angular dimension in both color spaces represented by the "hue" arrow in FIG. 8A) starts at the red primary at 0°, passes through the green primary at 120° and the blue primary at 240°, and then wraps back to red at 360°. In each geometry, the central vertical axis comprises the neutral, achromatic, or gray colors, ranging from black at lightness 805 of 0% (value 0) at the bottom of the cylinder, to white at lightness 805 of 100% (value 1) at the top of the cylinder (as shown by the "lightness" arrow in FIG. 8A).

In both geometries, the additive primary and secondary colors (red, yellow, green, cyan, blue and magenta) and linear mixtures between adjacent pairs of them (sometimes called pure colors) are arranged around the outside edge of the cylinder with saturation 1 (saturation 804 is represented by the "saturation" arrow in FIG. 8A). These saturated colors have lightness 805 of 50% in HSL, while in HSV they have a lightness 805 value of 100%. Mixing these pure colors with black, producing so-called shades, leaves saturation 804 unchanged. In HSL, saturation 804 is also unchanged by tinting with white, and only mixtures with both black and white, called tones, have a saturation 804 of less than 100%. In HSV, tinting alone reduces saturation 804.

Figure 8B:
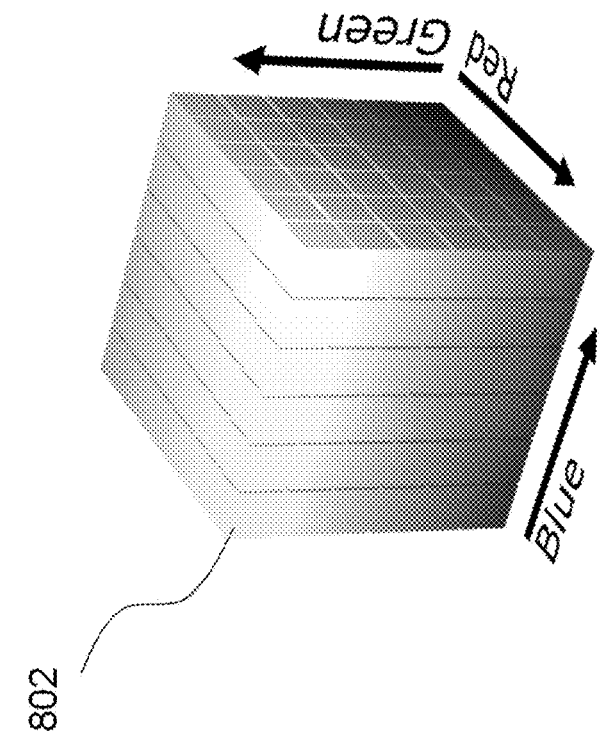
FIG. 8A and FIG. 8B are diagrams illustrating the conceptual and mathematical relationship between the HSL and red-green-blue (RGB) color formats, in accordance with some examples provided herein.
Figure 8A:
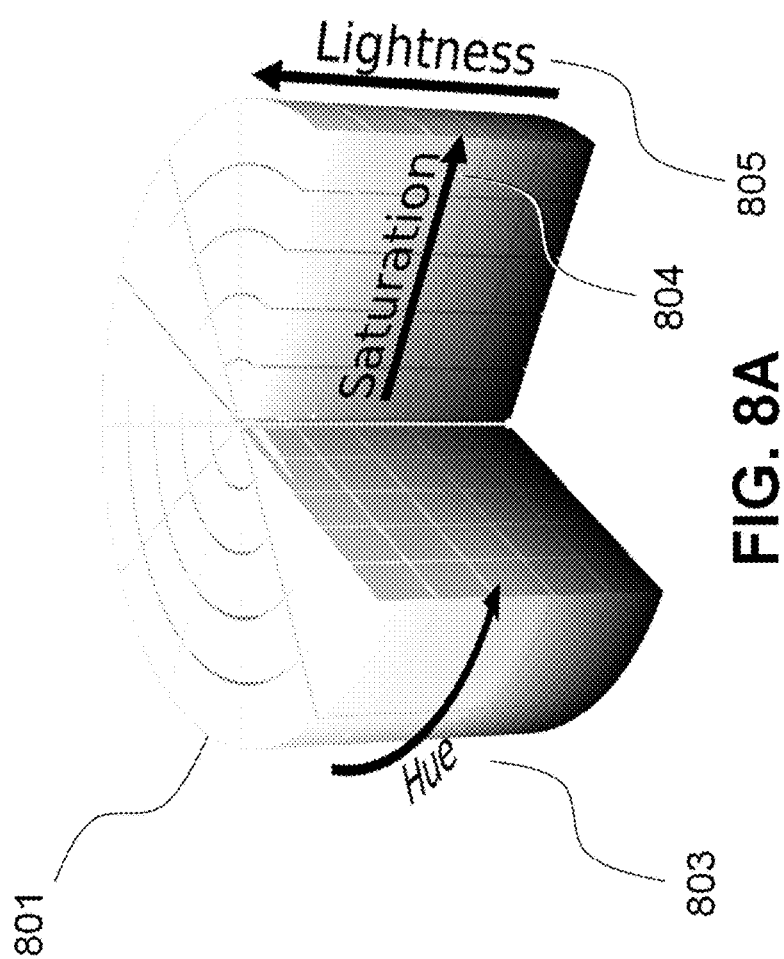

FIG. 8B is a diagram illustrating an example of a cubic representation 802 of the red-green-blue (RGB) color space. The mathematical relationship between the RGB and HSL color space is as follows:

$$L = R + G + B/3$$

$$S = 1 - (3/(R + G + B)) * \min(R, G, B)$$

$$H = \cos^{-1}((0.5(R - G)) + (R - B))/(((R - G)2) + ((R - B)(G - B)))^{0.5}).$$

Figure 9:
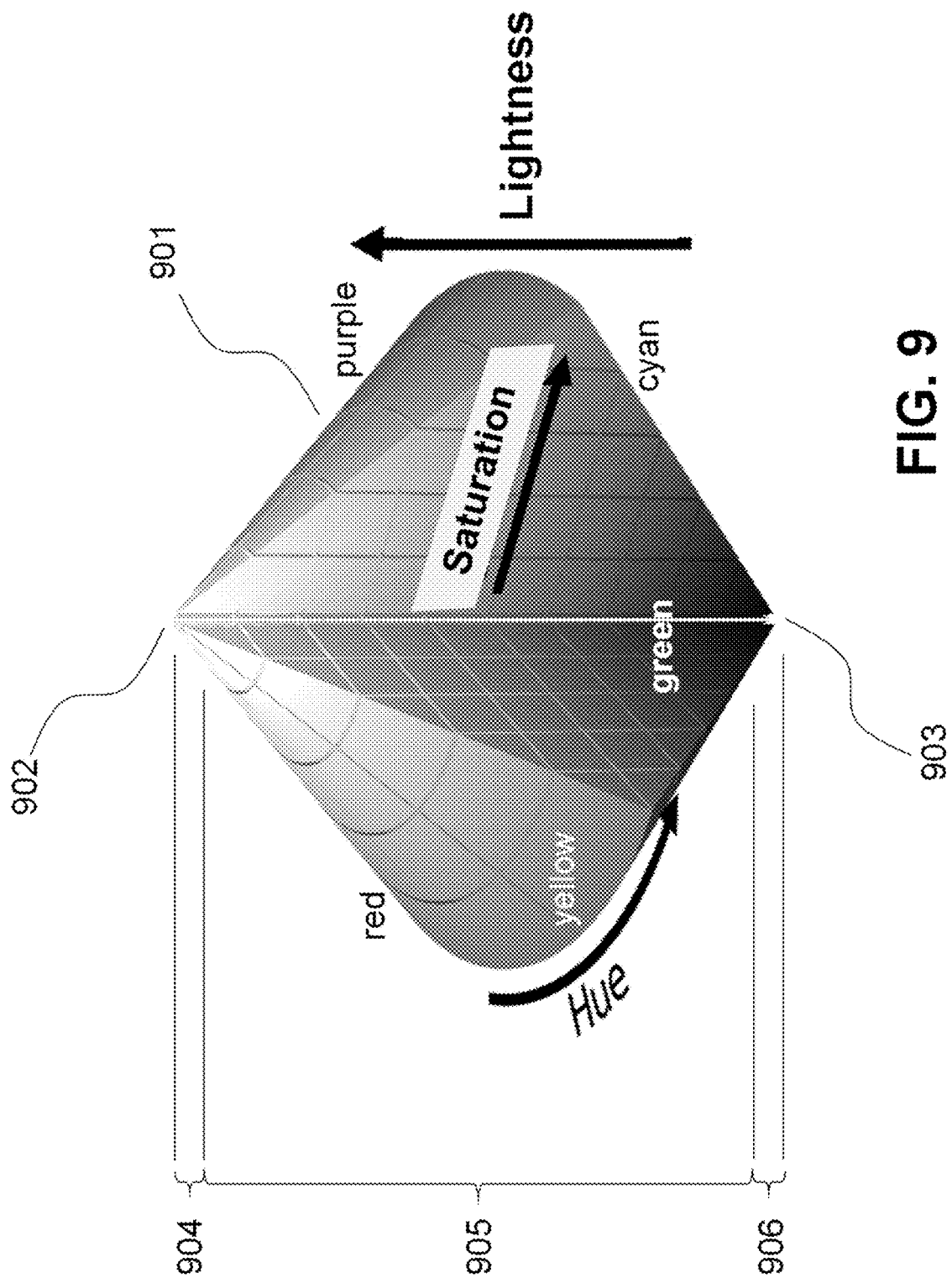
FIG. 9 is a diagram illustrating the color space representation of HSL in a bi-conic representation that reflects the available range of saturation relative to lightness, in accordance with some examples provided herein.

Because these definitions of saturation, in which very dark (in both models) or very light (in HSL) near-neutral colors are considered fully saturated, conflict with the intuitive notion of color purity, often a bi-conic representation 901 (also referred to as a cone) is used instead, as shown in FIG. 9. Saturation is used as the radial dimension of the bi-conic representation 901. Because the model with lightness in the vertical dimension takes the shape of a cone, HSL can be referred to as a "bi-cone model," as illustrated in FIG. 9.

Luminance-chrominance systems as applied to video are now described. As noted above, the HSL and HSV color systems were developed in the 1970's to serve the emerging computer graphics industry and, as also described above, were developed from existing color space systems in use for photography and other industrial applications. Prior to that in the 1950's, the television industry developed a similar color model that was suited to a unique requirement of the analog technology of the day, which was the need to add color to an industry already operating in monochrome. Furthermore, the addition of a color signal needed to be backward compatible with the millions of television receivers already in operation in consumer households. The fundamental principle employed treated black and white information (called luminance) and color information (called chrominance or chroma) as separate carriers. Luminance was designated Y. Chrominance (designated C) was split into two components, one for hue (called I) and one for saturation (called Q). The I, for in-phase, and Q, for quadrature, were two signals modulating the color subcarrier which, for the U.S. NTSC standard, was a 3.579 MHz carrier embedded with the amplitude-modulated luminance carrier and frequency-modulated sound carrier.

Later, as television production adopted digital encoding means (prior to HDTV), variations developed such as YUV and YCbCr (which will be referenced from here forward), among others, and together are sometimes referred to as luminance/chrominance, or Y/C, systems. In principle, the variations all relate back the HSL color space but are created as "color-difference" components or values derived from blue minus luminance (U and Cb) and red minus luminance (V and Cr). All Y/C systems directly translate to RGB, which is the final output to the display device. For example, RGB can be converted to Y'Cb'Cr' as follows:

$$Y' = 0.257 * R' + 0.504 * G' + 0.098 * B' + 16$$

$$Cb' = -0.148 * R' - 0.291 * G' + 0.439 * B' + 128$$

$$Cr' = 0.439 * R' - 0.368 * G' - 0.071 * B' + 128$$

Y'Cb'Cr' can be converted to RGB as follows:

$$R' = 1.164 * (Y' - 16) + 1.596 * (Cr' - 128)$$

$$G' = 1.164 * (Y' - 16) - 0.813 * (Cr' - 128) - 0.392 * (Cb' - 128)$$

$$B' = 1.164 * (Y' - 16) + 2.017 * (Cb' - 128)$$

There are advantages to systems that treat luminance separately from chrominance. One advantage is that Y/C systems were made to be compatible with previously existing monochrome analog television, and were developed for the compatible transition to color television in the 1950's as previously noted.

The Y' channel (where Y' is a gamma-corrected Y) contains the information recorded by monochrome cameras, producing a signal suitable for display on black and white systems. These black and white displays can ignore the C signal (the I-Q modulated color subcarrier) without harming the picture quality. On a color display, all signals are used, and the original RGB information is decoded.

Another advantage of Y/C systems is that some of the information can be discarded in order to reduce overall bandwidth requirements. One example of such a technique is called subsampling, which is described in more detail below. The human eye has less spatial sensitivity to color than luminance and so the accuracy of the brightness information of the luminance channel has far more impact on the image detail (as perceived by the viewer) than that of the color components. Understanding this human visual bias, industry standards, such as the now-obsolete NTSC, PAL, and SECAM standards, reduced the bandwidth of the chrominance channels considerably. The digital television standards of the world continue to process color information at a reduced bandwidth relative to luminance for the same reasons.

Therefore, the resulting U and V color signals of the Y'UV system, the principle components of the C signal, can be substantially compressed through chroma subsampling. For example, only half of the horizontal resolution compared to the brightness information can be kept. FIG. 5A through FIG. 5D are diagrams illustrating different chroma subsampling formats. FIG. 5A illustrates a picture with full 4:4:4 chroma subsampling format 501, FIG. 5B illustrates 4:2:2 chroma subsampling format 502, and FIG. 5C illustrates a 4:2:0 chroma subsampling format 503, where the vertical resolution is halved to give the 4:2:0 subsampling format 503. The 4:x:x representation primarily conveys the ratio of luminance to chrominance components and has been in use since the very earliest digital NTSC standard, which used a 4:1:1 chroma subsampling format 504, as shown in FIG. 5D. In the 4:1:1 chroma subsampling format, the horizontal color resolution is quartered (as shown by the empty dots), while the vertical color resolution is full resolution (as shown by the solid dots), in which case the picture carries only a quarter as much color resolution compared to brightness resolution. Video production systems may use uncompressed signals with 4:4:4 chroma subsampling format 501, providing identical resolution for both brightness and color information and is equivalent to the RGB values of raw video.

In place of Y'UV, the Y'CbCr color space is used as the standard format for digital video compression systems such as MPEG-2, H.264, and H.265. The Y'CbCr format is directly related to Y'UV, differing only in offset and scale. Digital broadcast television and digital versatile discs (DVDs) can preserve their compressed video streams in the MPEG-2 format, which uses a Y'CbCr color space while retaining the established process of chroma subsampling. The professional "CCIR 601" digital video format also uses Y'CbCr at the common chroma subsampling rate of 4:2:2, primarily for compatibility with previous analog video standards.

Y/C systems are not absolute color spaces. Rather, the Y/C representation is a way of encoding RGB information, and the actual colors that are displayed depend on the original RGB color space used to define the system. Therefore, values expressed as Y'UV or Y'CbCr are translated directly back to the values of the original set of primary colors of red, green, and blue. There are many color spaces in widespread use today including sRGB, adobeRGB, and ProPhotoRGB among many others. The television industry standardized on sRGB.

Furthermore, the range of colors and brightness (known as the color gamut) of RGB (whether BT.601 or Rec.709) is far smaller than the range of colors and brightnesses allowed by YUV. This can be very important when converting from Y'UV or Y'CbCr to RGB, since the formulas above can produce "invalid" RGB values, including values that are below 0% or above 100% of the range and thus outside the standard 16-235 luma range and 16-240 chroma range for TVs and HD content; or outside 0-255 for personal computer displays. Unless these values are scaled properly, they will usually be mathematically limited to the valid range of the channel affected. This changes the hue of the color, which can be undesirable, so television production systems provide a function to remap colors typically using a perceptual schema to keep colors within the RGB gamut, and, while colors are shifted, the overall perception to the viewer remains consistent.

Figure 6:
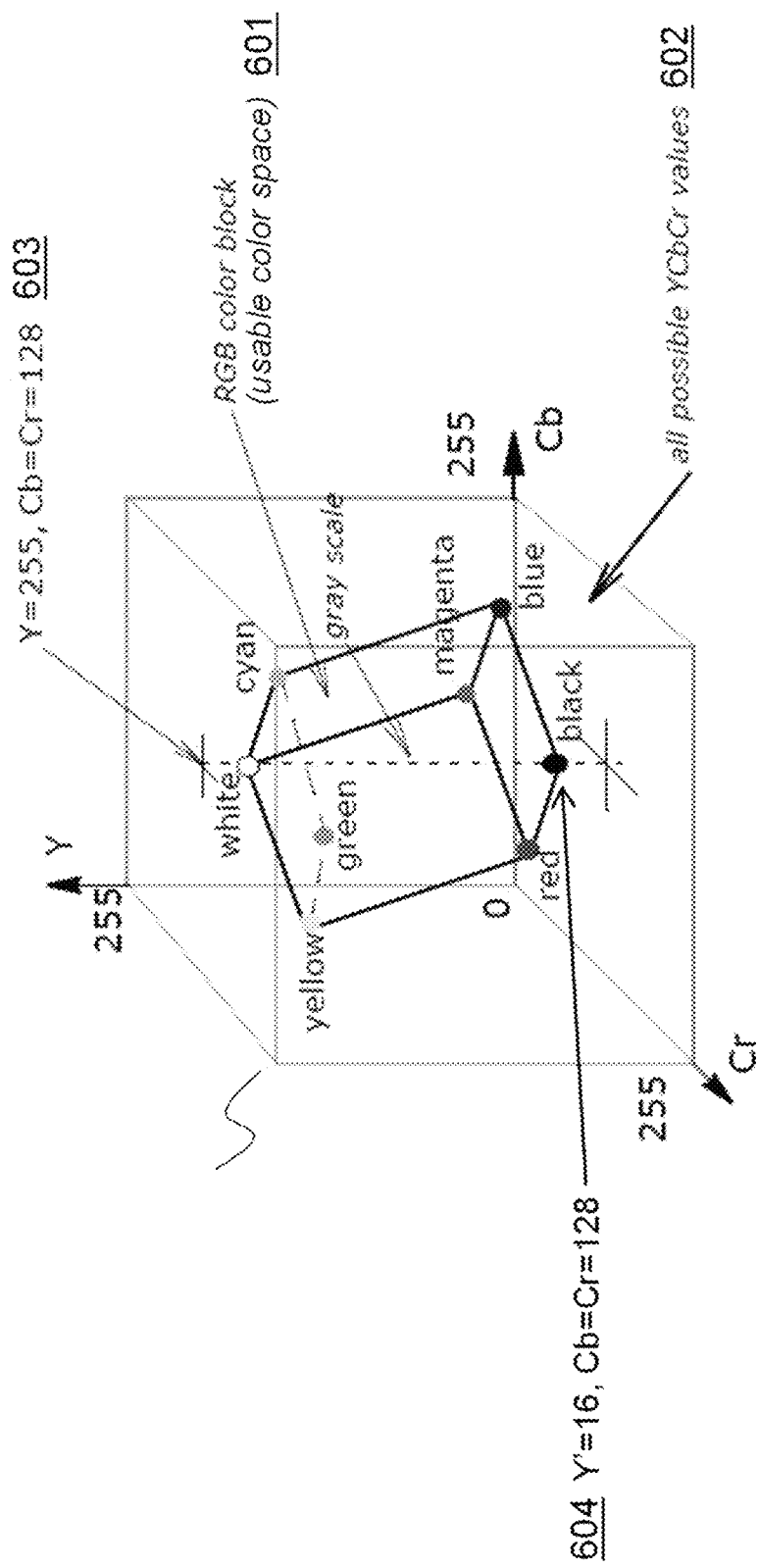
FIG. 6 is a diagram illustrating the luma-chroma (Y'CbCr) color format for images and/or video frames, in accordance with some examples provided herein.

The International Telecommunications Union (ITU) Rec. 709 defines an RGB encoding and a Y'CbCr encoding which is sometimes known as YCbCr, each with either 8 bits or 10 bits per sample in each color channel. FIG. 6 is a diagram illustrating the Y'CbCr format (represented as block 602 for all possible YCbCr values) formed by balancing the RGB color space (represented as an RGB color block 601) on its black point 604, with the white point 603 directly above the black point. The formulas for translating between RGB and Y'CbCr are given above. In the 8-bit encoding, the R, G, B, and Y channels have a nominal range of [16..235], and the Cb and Cr channels have a nominal range of [16..240] with 128 as the neutral value. Therefore, in RGB, reference black is (16, 16, 16) and reference white is (235, 235, 235). In Y'CBCR, as shown in FIG. 6, reference black is (16, 128, 128), and reference white is (235, 128, 128). Values outside the nominal ranges are allowed, but typically they would be clamped for broadcast or for display. Values 0 and 255 can be reserved as timing references and may not contain color data. Rec. 709's 10-bit encoding uses nominal values four times those of the 8-bit encoding. Rec. 709's nominal ranges are the same as those defined in ITU Rec. 601.

As noted above, the video formats of Y'CbCr, Y'UV, or the older analog YI/Q all directly translate to R, G, and B values, as does the above example of HSL shown in FIG. 8A. Hence, one of ordinary skill will recognize that any discussion of color space is absolute between any two systems, allowing any one color space to be directly translated into the other color space by utilizing simple arithmetic. With this understanding, the techniques described herein will be described in terms of Y'CbCr for the transmission through a network to receiving device (e.g., a television display, such as an HDTV). Any type of receiving system (e.g., a television receiver system of any type) can then translate Y'CbCr to RGB (or other color space if needed) for the ultimate display of the watermark encoded video frames of the application.

The techniques described herein can hide data in a video frame by taking advantage of the defined color spaces as well the understanding of human visual perceptual and its boundaries. The concept of representing color space in terms of hue, saturation, and lightness was first illustrated by Wilhelm Ostwald in 1916, a Nobel laureate in chemistry for his work on chemical equilibria, who was interested in systematizing the process of color value creation from the artist's perspective of mixing base colors with successive degrees of white (the top portion 902 of the bi-conic representation 901 shown in FIG. 9), and alternatively mixing base colors with successive degrees of black (the bottom portion 903 of the bi-conic representation 901), which is a subtractive process when applied to the chemistry of paints.

In 1963, the professor and artist, Josef Albers, published a seminal study entitled "Interaction of Color" from his work on human perception of color. His influential study explored the combination of colors examining contrasting interactions of color on human perception. Albers and many notable artists from the Bauhaus school fled Germany in the 1930's and came to the U.S. He first settled at Black Mountain College in North Carolina teaching fine arts while exploring color theory. In 1950 he accepted a professorship at Yale University. Notably, one aspect of his studies illustrated how a fixed color appeared to be very different depending on the colors surrounding it. His book and many other publications aptly illustrated this effect among others.

In 1987, the Tektronix company, a noted leader in test equipment, received U.S. Pat. No. 4,694,286. This patent taught the use of the bi-cone HSL model for color graphics terminals for which Tektronix became a pioneering leader along with technology for television broadcast.

The techniques described herein utilize this information with an understanding of color space representations (e.g., for television and other content) along with the understanding of human perception to color to manipulate the parameters of hue (H), saturation (S), and lightness (L), as represented in the Y'CbCr format in order to hide digital data in plain sight in a video frame. For example, referring to the HSL cylinder 801 shown in FIG. 8A, it can be shown that for any hue 803 at a low or high lightness 805, the saturation 804 and be changed for a small area of the display screen without being noticeable to the human eye. For a low or high lightness 805 for some colors, hue 803 can be shifted with little discernibility. At near full lightness (white) or near minimum lightness (black), hue and saturation can be changed significantly without creating a visible artifact.

In some cases, there is a range of lightness 805 that does not lend itself to encoding changes in hue 803 and/or saturation 804. As noted above, FIG. 9 is a diagram illustrating a bi-conic representation 901 of the HSL color space. The modulation space used by the techniques described herein can include the color space shown in bi-conic representation 901. To obtain the bi-conic representation 901, the cylinder of HSL is modified to create two adjoined cones (hence, the bi-conic representation 901), with white at the top portion 902 of the top cone and black at the bottom portion 903 of the bottom cone. The very top of the bi-conic representation 901 (the top portion 902 representing white) can be a single data point where lightness is at a maximum value, saturation is at zero, and hue is indeterminant (when saturation is zero), in which case no change in saturation (S) or hue (H) would change the translate value in RGB which, in an 8-bit system, would be 255, 255, and 255, respectively. Similarly, when lightness is at a minimum (the bottom portion 903 representing black), saturation (S) would again be zero, rendering hue (H) indeterminant for an RGB value of 0, 0, 0. As defined above, the luminance signal (Y') is limited to the range of 16 to 235 out of 0 to 255, which is 86.3% of its total range. Similarly, the Cr and Cb color-difference components (or signals) are limited to 16 to 240 in a range of 255, which is 87.9% of the available range. In some implementations, for compatibility reasons, the range of HSL values used by the techniques described herein can be limited to the lightness range 905 of 86.3%, where the minimum 906 represents 6.3% above black and the maximum 904 represents 94.1% of full-scale of lightness (or 5.9% below peak white).

Figure 2:
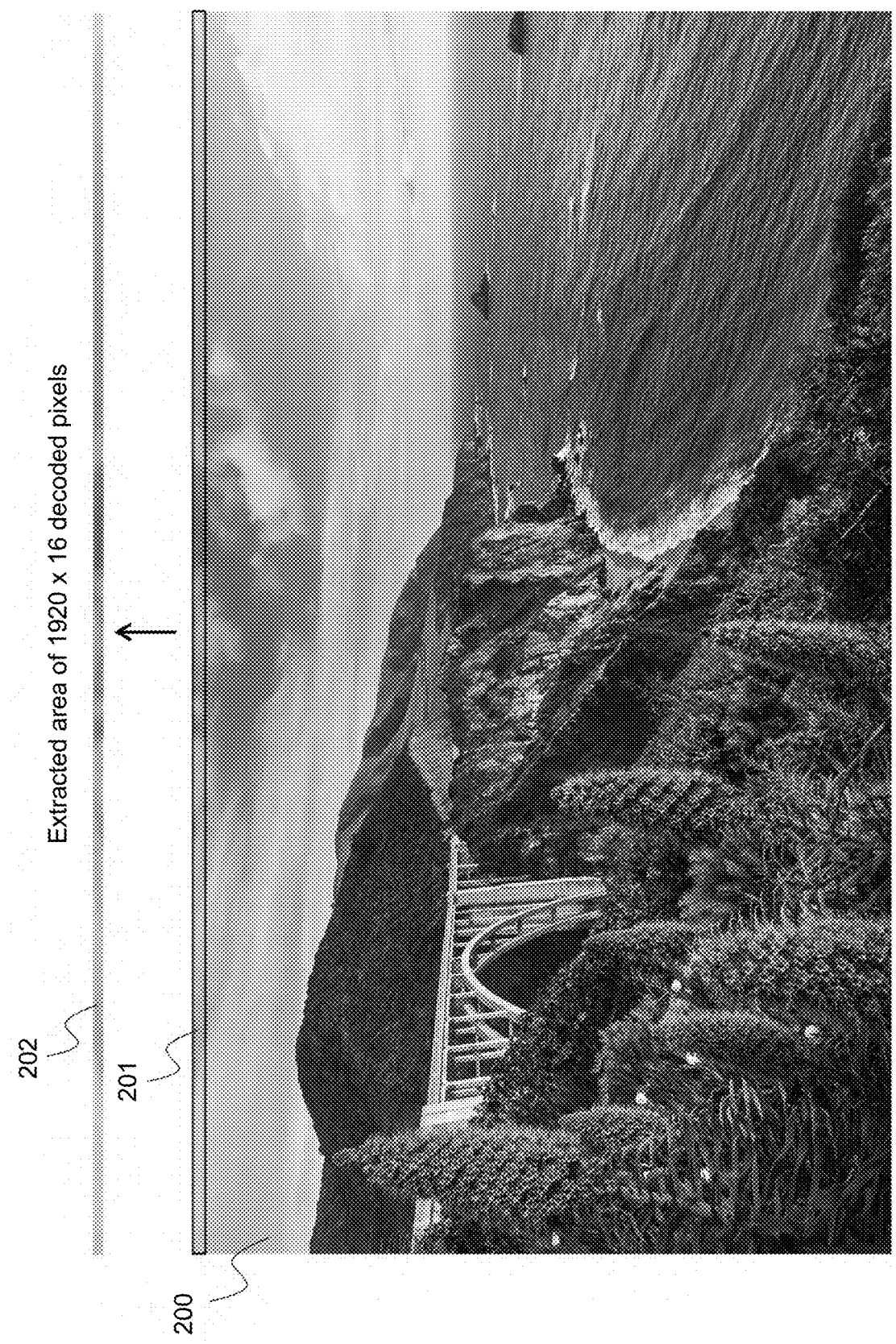
FIG. 2 is a diagram illustrating a video frame of a source video from which the top rows of pixels of a video frame have been extracted, in accordance with some examples provided herein.

The watermarking techniques described herein can obtain an encoded video frame that will be processed for embedding additional watermark data (referred to as additional data or binary data). A portion (less than all) of the encoded video frame can be decoded, which will be used to add the additional data. As an illustrative example, the top one or more rows of pixels can be extracted and decoded. FIG. 2 is a diagram illustrating a video frame 200 of a source video from which the top rows of pixels 201 of the video frame 200 have been extracted, resulting in an extracted area 202 of a certain dimension (e.g., 1920×16, including the top 16 rows of pixels). The extracted area 202 can be decoded. For instance, the extracted area 202 can be decoded, while the remaining portion of the video frame 200 can be left encoded while the extracted area 202 is processed to embed the additional data. The additional data can be embedded or encoded into the pixels of the extracted area 202, such as by modulating or altering one or more samples (e.g., one or more color-different components) of each of the pixels. In some cases, as described below, the subsampling rate of the extracted area 202 can be changed in order to increase the amount of color information. The extracted area 202 can be re-encoded once the additional data is embedded therein. In some examples, the coding mode for a certain portion of the extracted area 202 can be defined to be different than the coding mode of a different portion of the extracted area 202, and the extracted area 202 can be re-encoded using the coding modes. The extracted area 202 with the additional data embedded therein can be added back to the encoded video frame 200 (e.g., by stitching the one or more rows of pixels back into the rest of the frame 200).

In some implementations, certain characteristics of an encoded video representation (e.g., MPEG, H.264, H.265, VVC, or other type of encoded video representation) and data structures can be taken advantage of to further enhance the resiliency of the embedded data watermark. In such implementations, frames of video from can be decoded and a certain number of pixel rows can be extracted from the top and/or bottom (and/or the left and/or right) of the frame. In some cases, the minimum number of pixel rows can be extracted, such as 16 pixel rows as described above. In one illustrative example, in the case of MPEG-2 or H.264/265, the minimum processing unit of video is the macroblock, which can be defined as having a 16×16 pixel structure. In such an example, because 16 pixel rows is the minimum size of a subset of an MPEG frame (the macroblock) that is separately manipulatable when processing compressed video, the macroblock is extracted and decoded for processing without the need to decode the entire encoded frame. In some cases, the frame can be decoded as a whole, and the top 16 pixel rows (e.g., the top row of blocks, such as macroblock) are extracted for processing. One or more pixel rows (e.g., a minimum of two pixel rows) of the extracted and decoded pixel rows, such as the top 16 pixel rows, can be encoded with additional data.

Figure 3A:
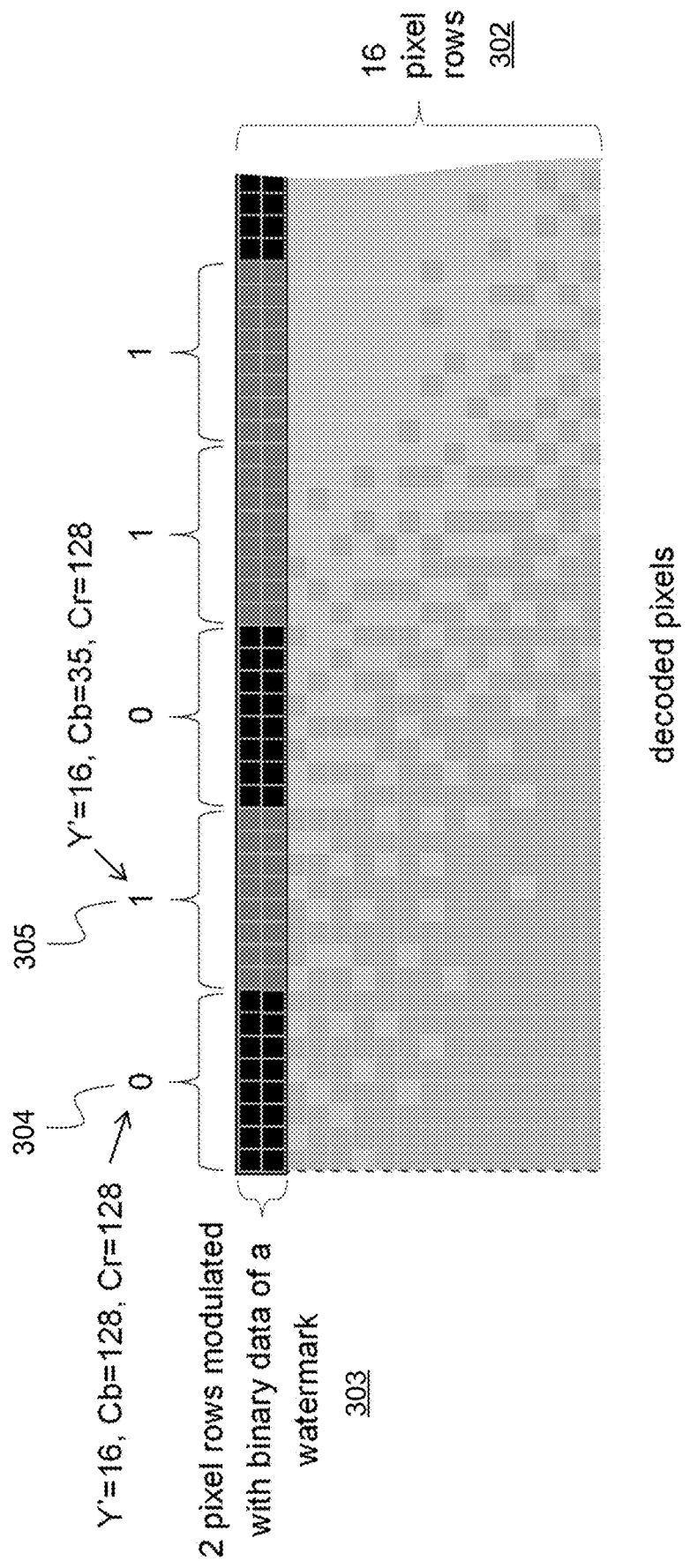
FIG. 3A is a diagram illustrating the top two pixel rows of 16 total pixel rows of a video frame embedded with a binary code, in accordance with some examples provided herein.

An illustrative example of the process will be described with reference to FIG. 3A, FIG. 3B, and FIG. 3C. FIG. 3A illustrates 16 pixel rows 302 that have been extracted from a video frame (similar to the extracted area 202 from FIG. 2). In some cases, the 16 pixel rows 302 are extracted due to the video coding technique used to encode the video frame. For example, as described above, each block of the encoded video frame may be 16 pixels in height, and at least one block may need to be extracted so that the block can be decoded and re-encoded using the techniques described herein. A block can include a macroblock (e.g., from H.264 or Advanced Video Coding (AVC), a coding tree unit (e.g., from H.265 or High Efficiency Video Coding (HEVC), or other type of block.

Once extracted, one or more lines (or columns) of video data are modulated with the additional watermark data. For example, the top two lines of video data can be encoded with the additional data (which can be in compliance with the A/335 standard). As shown in FIG. 3A, the modulated values of sixteen pixels (eight in the horizontal direction from the top two lines) represent a binary value. In some examples, additional lines or columns of pixels can be encoded with additional data. In examples when only the first two lines of pixels are encoded with watermark data, the 16 lines of video information (including the two lines of pixels with the additional data) that were extracted can be prepared for reinsertion into the encoded (compressed) video frame.

Figure 13:
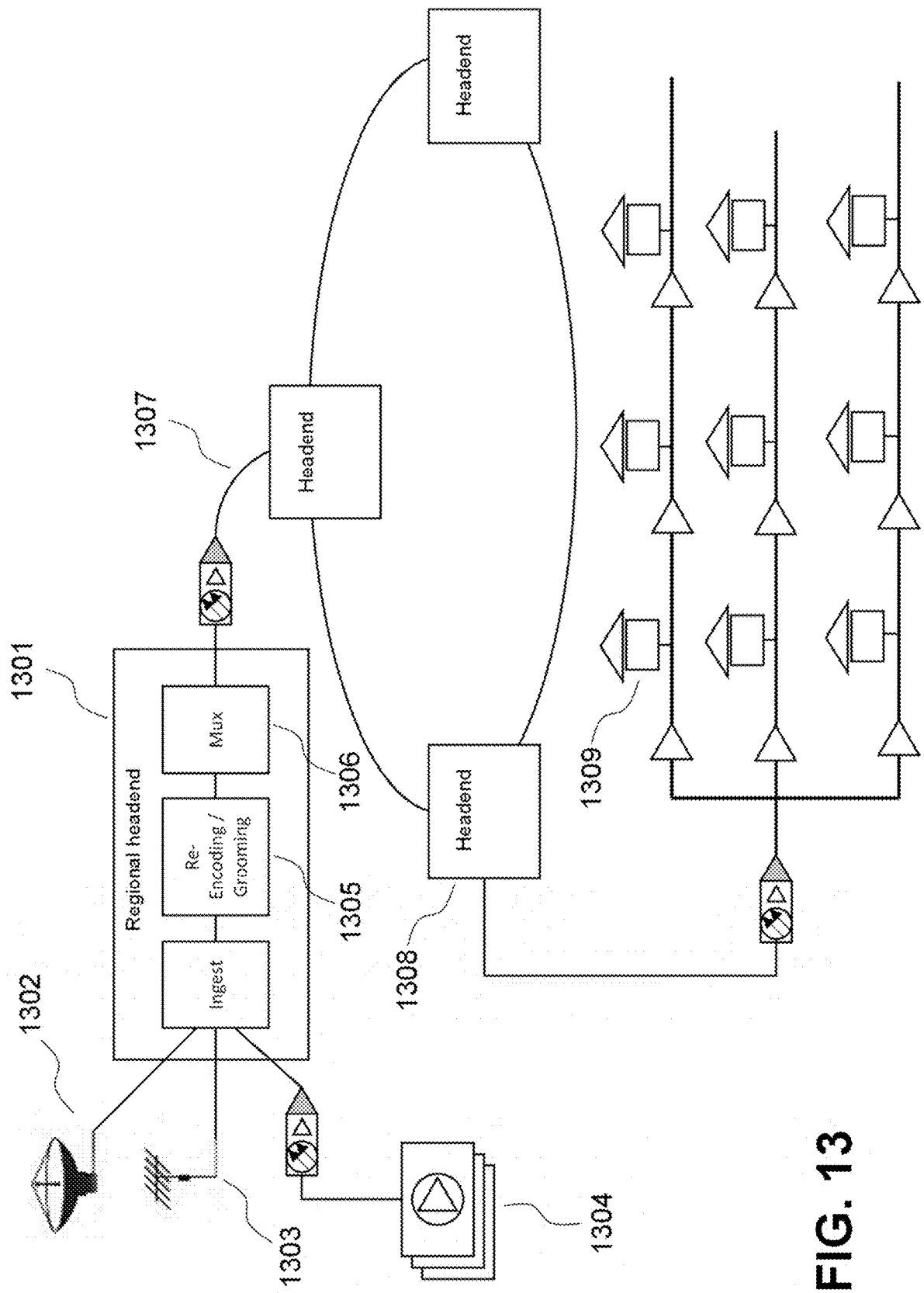
FIG. 13 is a block diagram illustrating an example of a cable television system, in accordance with some examples provided herein.

To encode the additional watermark data into the one or more rows of pixel data, a binary code can be added that is based on a shift in a luminance component and/or one or more color-difference components (e.g., a Cb color-difference component and/or a Cr color-difference component) of one or more pixels in the one or more rows of pixel data. For example, in some implementations, the process of embedding a digital watermark (the additional information) into video frames can be performed by modulating the luminance signal with low and high levels of Y' (corresponding to light and dark pixels). In some implementations, the luminance component (Y or Y') can be maintained at or near a black value (e.g., Y'=16, Cb=128, Cr=128) to represent a binary zero value and the Cb and/or Cr color-difference values can be modulated in such a way as to create a data value of binary one (e.g., with a value of, for one example, Y'=16, Cb=35, Cr=128). In another illustrative example, a binary zero can be represented as Y'=16, Cb=35, Cr=128, and a binary one can be represented as Y'=40, Cb=194, Cr=134, in which case the Y' value is minimally changed. Such modulation leads to a great degree of difference between zero and one, providing a more resilient data representation in anticipation of re-encoding that can be imposed on the data watermark as the video segment is moved through a distribution network (e.g., a television distribution network of cable, satellite, and/or Internet-based, as shown in FIG. 13). An advantage of encoding the data signal by modulating the chrominance color-difference values is that the result produces what appears to the viewer as simply black lines, which at the top of the TV frame is indistinguishable from the television display frame or bezel.

Returning to FIG. 3A as an illustrative example, the top two pixel rows 303 of the 16 pixel rows 302 of the video frame are embedded with a binary code, such as a 0 binary code 304 (represented by the modulated values of the first set of sixteen pixels, including eight pixels in the horizontal direction from the top two pixel rows 303) or a 1 binary code 305 (represented by the modulated values of the second set of sixteen pixels, including eight pixels in the horizontal direction from the top two pixel rows 303). As noted above, the binary code can be based on a shift in one or more color-difference components (e.g., a Cb color-difference component and/or a Cr color-difference component) of the pixels in the top two pixel rows 303.

In some cases, the Cb and/or Cr shifts used to alter the data carrying pixels in the one or more pixel rows (e.g., the top two pixel rows 303 in FIG. 3A) can be determined algorithmically. For instance, the original top two pixel rows can be sampled, and the pixels can be can modulated or altered based on characteristics of the pixels. In one illustrative example, if the average lightness of a pixel is less than 20% of full scale (a dark color), then values of Cr and/or Cr can be changed by, for instance, 35% with a commensurate Cb and/or Cr range that might be limited to a smaller step. This can be due to the pixel block averaging of modern video encoders. In another illustrative example, at the other extreme when lightness is above, for example, 85%, the difference between Cb and/or Cr values between zero and one may need to be greater in magnitude, again due to the averaging effect of the video encoder.

In some implementations, techniques can also be performed to improve the robustness of the additional watermark data embedded in the video frame. For example, video encoding systems, such as MPEG-2, H.264, H.265 among others, achieve substantial degrees of data compression by eliminating data within the video signal that is generally not visible to human visual perception. It is noted that, because H.264 and other video coding techniques are also classified as MPEG versions, MPEG will be used in some examples herein to generically represent the entire family of video encoding standards. A cost of the compression process is that digital signals embedded in a video frame (e.g., the embedded watermark data) will be adversely altered along the path from the video source to the receiving device, leading to the data being visually smeared and differences between zero and one data codes (or symbols) being reduced such that data errors increase because of the increased noise in the video. Accordingly, in some cases, the distinction between a zero and one representation of the watermark data embedded in the video can be negatively affected.

An example of a cable television distribution system is illustrated in FIG. 13. As shown, video content (which can also include audio content, metadata, among other data) arrives at a regional headend 1301. Content can be ingested from satellite 1302 sources, off-air broadcasts 1303, and/or from content distribution providers 1304 (e.g., for live and/or on-demand content). The video content arrives in many different formats and at differing frame sizes (or frame resolutions). In one example, content can include video frames having a resolution of 1920×1080 pixels, 1280×720 pixels, or other resolution in an interlaced frame type. In another example, content can include video frames having a resolution of 1920×1080 in a progressive frame type at 23.98 frames per second (fps) (e.g., for feature films from content distribution provider 1304). In another example, television programming can originate as 1920×1080 interlaced video, but have third party content (e.g., TV ads) embedded in the programming at 1280×720 at 23.98 fps. Standard definition content can be distributed using 720× 480 frame sizes and with a 4×3 aspect ratio in the same network distribution with HDTV (16×9 aspect ratio).

A re-encoding engine 1305 of the headend 1301 can decode and then re-encode (referred to as transcoding) at a higher compression setting of video sources to reduce individual video program bit rates. In some cases, progressive scanned video can be converted to interlace scanned video (e.g., by cutting the video data in half). A multiplexer 106 can take the transcoded (decoded and re-encoded) video and multiplex video programs from the transcoded video into transport streams 1307. The transport streams 1307 can be transported over a distribution network (e.g., a fiber-optic network, coaxial cable network, over-the-air network) for distribution to one or more geographic regions serving individual headends 1308 for distribution to one or more destinations 1309 (e.g., a business, a home, or other destination).

This alteration of the digital video resulting from the one or more network processes re-encoding the video program content reduces the amount of data, and thus the quality of the video (leading to a reduction occupied bandwidth), to allow more programming to occupy a given network bandwidth. The data reduction lowers the quality of a video program, but generally to a level acceptable to an end user. However, the loss to the binary data (making up the additional watermark data) can be substantial, and can result in a receiving device being unable to interpret the binary data or expending massive resources to interpret the binary data.

Video content (e.g., television program content) can be encoded with the 4:2:0 subsampling pixel representation, which represents color information at one-quarter of the amount of luminance information. The 4:2:0 subsampling represents a chrominance value as one pixel per four luminance pixels, which is roughly the sensitivity of human visual perception of black and white information compared to color. Even more harmful to the color signal, video compression systems (e.g., H.264 based systems) average this one pixel over an 8 by 8 pixel area when performing intra-prediction or compression (also referred to as intra-frame prediction), which further blurs its boundaries. Based on this, in some cases, a digital watermark system that modulates only or mostly the color-difference components of the video picture (Cb and/or Cr) is at a disadvantage to modulating only the Y signal. Additional data can still be embedded into a video frame by modulating the color-difference signals, as described above, but may be less resistant to errors if transported in a long chain of video distribution from its source to the receiving device. For example, the additional watermark data can be applied in the chrominance domain only (or in some cases to the chrominance domain and/or the luminance domain) in one or more video frame (e.g., the top two pixel lines), and the entire video segment carrying the watermark can be encoded in a video coding (compression) format (e.g., MPEG-2, H.264, H.265, VVC, or the like) and then ingested into the video distribution network.

To improve the robustness of the additional watermark data embedded in the video frame in view of the above-described shortcomings, a variety of techniques can be performed. In some cases, the subsampling format of the extracted one or more pixel rows (e.g., the 16 pixel rows 302 shown in FIG. 3A) of the video frame can be modified to increase an amount of chrominance information in the one or more pixel rows. In one illustrative example, the coding mode of the extracted one or more pixel rows (e.g., the 16 pixel rows 302 shown in FIG. 3A) of the video frame, where the top one or more lines are modulated with the watermark data, can be set to the 4:2:2 subsampling pixel encoding format 502 shown in FIG. 5B (modified from the 4:2:0 subsampling pixel encoding format 503 shown in FIG. 5C). Modifying the format from the 4:2:0 subsampling format to the 4:2:2 subsampling format doubles the amount of chrominance information compared to the 4:2:0 subsampling format 503, but only for the top one or more pixel rows out of all pixel rows of the entire frame (e.g., the top 16 pixel rows 302 out of a total of 1080 pixel rows). Because the subsampling rate of only the top one or more pixel rows is modified, only a minor overall addition of chrominance data is added to the video stream. The watermarked video in this enhanced format can then be encoded, as noted above, and sent into the video distribution network.

In some cases, another technique to strengthen the protection of the additional video watermark data in a video frame is to establish a slice boundary (e.g., as defined in MPEG, H.264, H.265, VVC, or other video coding standard) for the extracted one or more pixel rows (e.g., the 16 pixel rows 302 shown in FIG. 3A) of the video carrying the one or more watermarked data lines (e.g., the top two pixel rows of the extracted one or more pixel rows). The extracted one or more pixel lines, which can correspond to a row of blocks (e.g., macroblocks, CTUs, etc.), can thus be encoded as an MPEG slice (or slice according to another video coding standard) using an intra-prediction mode. For intra-prediction modes, a video encoder may form a predicted block using spatial prediction techniques based on data from previously encoded neighboring blocks within the same picture (or frame). For inter-prediction modes, a video encoder can perform motion estimation by searching for a block similar to the block being encoded in a picture (or frame) located in another temporal location, referred to as a reference frame or a reference picture. An intra-prediction frame type being coded using an intra-prediction mode can include a group of macroblocks that will have no motion estimation applied to them. In some cases, the slice can be configured to be encoded with a low-value quantization parameter (QP) to reduce the amount of video compression applied to the pixels of the slice layer. QP controls the degree of quantization (e.g., the quantization step size) performed on a coefficient block associated with a coded block (e.g., a coding unit (CU)), and is inversely proportional to video quality. This video compression is referencing the intra-frame image compression of the MPEG family processes which can be especially aggressive in modern video codecs such as H.264.

Figure 3B:
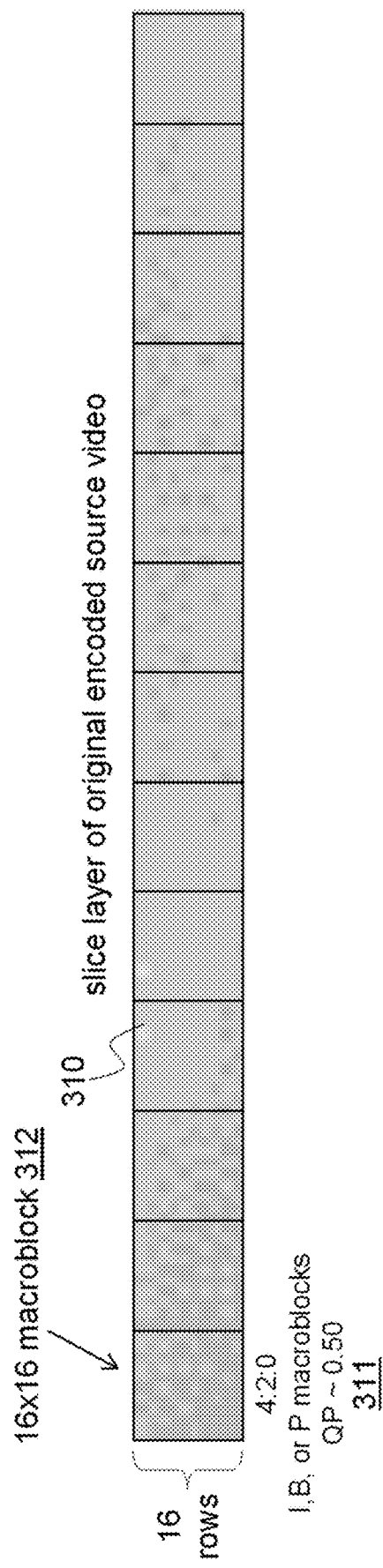
FIG. 3B is a diagram illustrating the top 16 pixel rows from the video frame in a slice format, in accordance with some examples provided herein.

FIG. 3B is a diagram illustrating a slice (e.g., an MPEG encoded slice) established for extracted pixel rows. As shown, the slice 310 includes the top 16 pixel rows from the video frame in an encoded format. The slice 310 can be composed of macroblocks 312 in the MPEG family specification. The slice 310 can be a slice layer of the original encoded video frame. For example, the macroblocks 312 can include macroblocks of size 16×16 that were extracted from a video frame and that have been arranged into the slice 310. The macroblocks 312 can include, for example, a macroblock 311 that has a subsampling rate of 4:2:0, a QP of 0.5, and is coded using an intra-prediction mode (or I-mode) or an inter-prediction mode (e.g., a bi-predictive mode (B-mode) or uni-predictive mode (P-mode)). In some examples, the subsampling rate can be modified, as described above. For example the subsampling rate can be modified from the 4:2:0 subsampling format to the 4:2:2 subsampling format.

In some examples, to further enhance additional watermark data integrity, a first coding mode can be defined for a top portion of the extracted one or more pixel lines, and second coding mode can be defined for a bottom portion of the extracted one or more pixel lines. The top portion and the bottom portion can then be re-encoded using the first coding mode and the second coding mode, respectively. For instance, in one illustrative example, the first eight lines of an extracted macroblock (e.g., including the top 16 pixel lines of a video frame) can be assigned an intra-prediction mode of 0 (in a vertical direction, where a sample above the sample being predicted is used for the prediction), which can effectively turn off intra-block prediction, further maintaining the integrity of the watermark data. In such an example, the lower eight lines can be re-encoded using the originally-specified coding mode for those pixel rows. In some examples, the lower eight lines can be re-encoded with the original video's prediction value to maintain a video quality consistent with the remaining 1,064 lines of the video frame. The 16 lines of video extracted from the top and/or bottom of the video frame are then ready to be re-encoded in the format (MPEG-2, H.264, etc.) of the original encoded video received by the watermarking system.

Figure 3C:
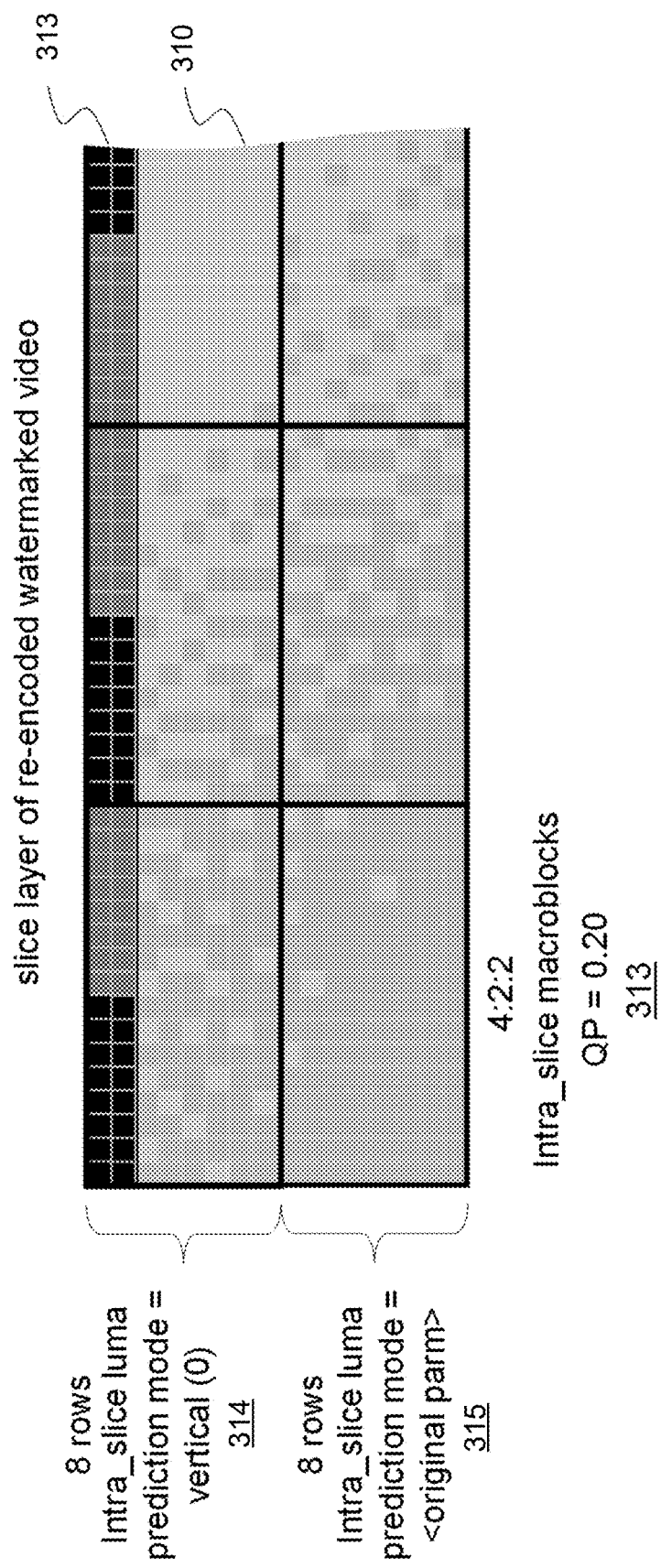
FIG. 3C is a diagram illustrating re-encoded blocks of the slice from FIG. 3B, in accordance with some examples provided herein.

FIG. 3C is a diagram illustrating re-encoded blocks of the slice 310 from FIG. 3B. As shown, the top 8 pixel rows 314 (including the top two pixel rows 313 with additional watermark data added) are coded using an intra-prediction mode 0 (vertical mode), and the bottom 8 pixel rows 315 are coded using the original prediction mode that was performed for the video frame 200. In some cases, the original prediction value is used for the bottom 8 pixel rows 315. As shown, the subsampling format of a block 313 (e.g., corresponding to a 16×16 macroblock or other block) is modified to the 4:2:2 subsampling format. The block 313 is also coded using an intra-prediction mode and with a lower QP (0.2) than the block 311 in FIG. 3B (where the QP was 0.5).

As described above, the subset of the video picture is re-encoded and can be packaged as a video slice (e.g., slice 310). In some cases, the re-encoded pixel lines (e.g., the re-encoded blocks, the re-encoded slice of blocks, etc.) can be overlaid or added back to the original encoded video frame (e.g., the video frame 200 from FIG. 2) of the original video source using image stitching (e.g., MPEG stitching), also known as compositing. Any suitable image stitching or compositing technique can be used. In some cases, the image stitching can include aligning the re-encoded pixel lines with the original encoded video frame (e.g., using a mathematical model to relate pixel coordinates in the re-encoded pixel lines with the pixel coordinates of the original encoded video frame), and blending the pixels (e.g., including adjusting pixel values, such as pixel values of the original encoded video frame, including gain adjustment by minimizing intensity differences of overlapping pixels, and/or using other suitable techniques) so that there is no seam between the re-encoded pixels and the pixels of the original encoded video frame.

Figure 3D:
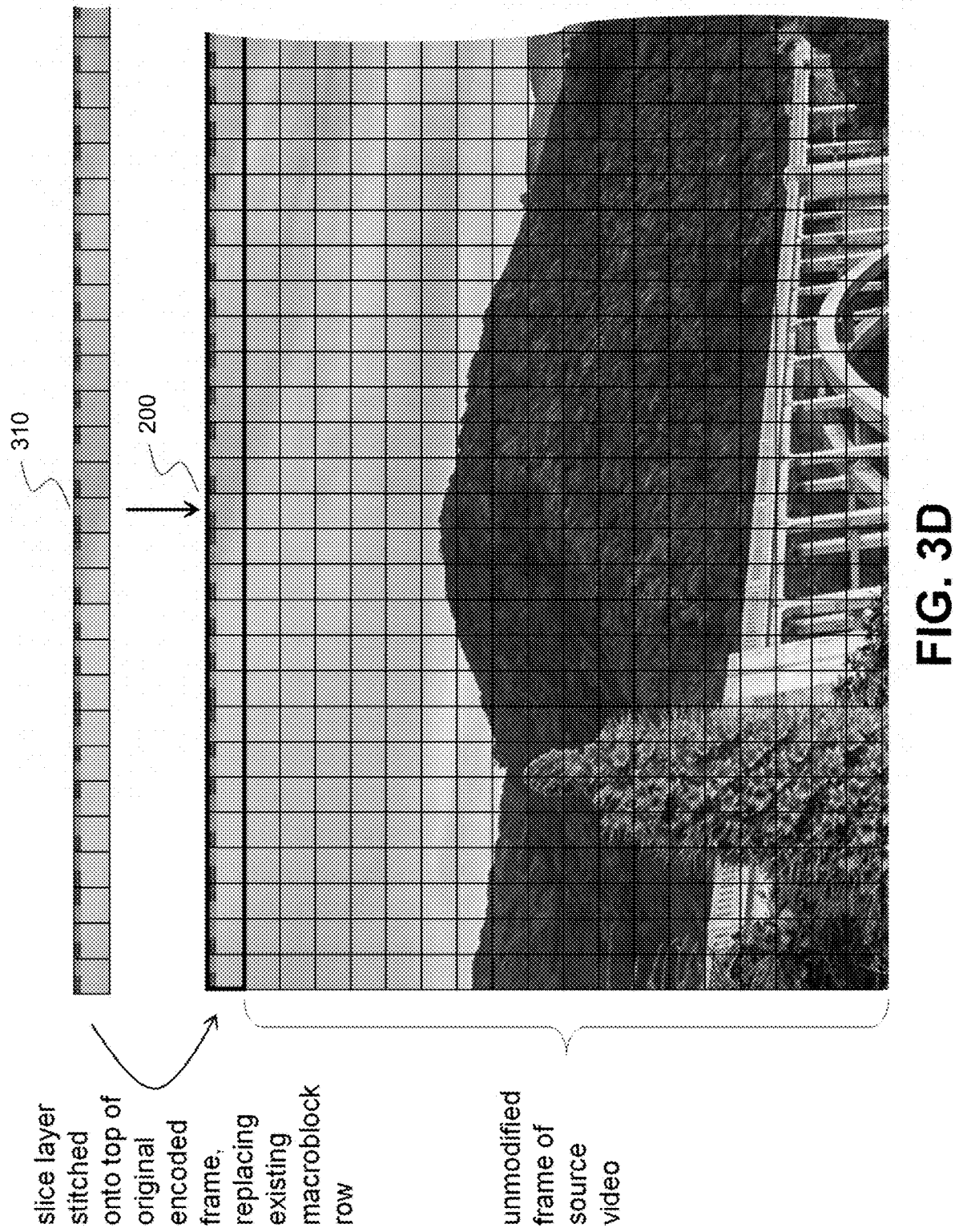
FIG. 3D is a diagram illustrating a slice layer containing the rows of re-encoded pixels stitched back to an unmodified encoded video frame of the source video, in accordance with some examples provided herein.

FIG. 3D is a diagram illustrating the slice 310 containing the top rows of re-encoded pixels stitched back to the unmodified encoded video frame 200 of the source video (from FIG. 2). The re-encoded slice replaces the originally encoded slice including the top one or more rows of the encoded video frame 200. Using the example described above, the slice-level stitching process adds back the two or more lines of watermark data within the 16 line slice in a now more robust compressed video representation with minimal impact to the overall video data size and, importantly, no noticeable difference in quality between the stitched, data-carrying slice layer and the remainder of the video picture.

By extracting and decoding the one or more lines (e.g., the top 16 pixel rows) from the encoded video frame, performing the processes described above, and then stitching the re-encoded top one or more lines back into the encoded video, the entire source video content does not need to be decoded, have watermarked data applied thereto, and then completely re-encoded for the purposes of adding the additional watermark data to only the top one or more lines.

In some examples, the additional watermark data included in the pixel rows of compressed (re-encoded) video data can be represented as intra-frame block-based video, regardless of the underlying frame type of the original block. FIG. 4 is a diagram illustrating the top row of re-encoded blocks encased in an intra-prediction frame type slice layer (slice 402), regardless of the underlying frame type. For example, the additional watermark data contained in the slice 402 of 16 pixel rows of re-encoded video data can be represented as an intra-frame macroblock video (or video having other types of blocks, such as CTUs). The intra-frame slice 402 is defined so that each macroblock has an I-type (intra-prediction is applied). As noted above, the slice can be stitched into the original video frame with a normal group of pictures (GOP) 403 containing intra-prediction, bi-directional inter-prediction, and uni-direction inter-prediction (or predictive) frame types (I, B, & P). Because I-frames are encoded using only data from the frame (or picture), and not data from other frames (or pictures), the intra-frame slice 402 further insures digital data integrity even in the face of one or more re-encodings of the video stream.

Figure 10:
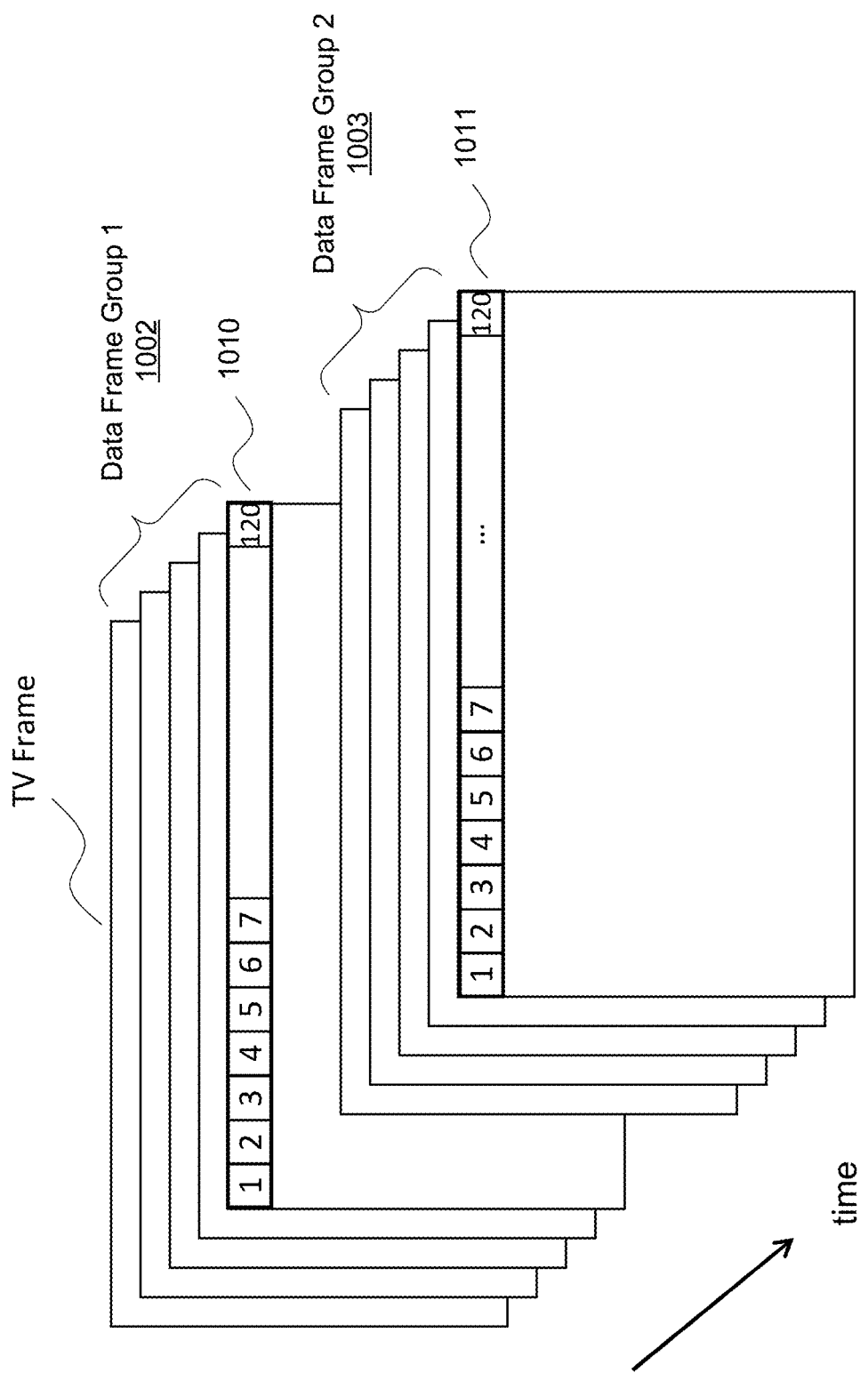
FIG. 10 is a diagram illustrating embedding of data in a plurality of video frames, in accordance with some examples provided herein.

In some examples, frames of video can be encoded in groups and carry a complex data message across multiple video frames. FIG. 10 is a diagram illustrating an embedding of additional watermark data in a plurality of video frames (e.g., television frames), with the data representing complex messages distributed across the plurality of video frames. For example, a first group (group 1) of frames 1002 is shown with the last frame in the first group containing a top one or more pixel rows 1010 with additional watermark data. A second group (group 2) of frames 1003 is shown with the last frame in the second group containing a top one or more pixel rows 1011 with additional watermark data. To decode multiple video frame watermarks into a composite message, any suitable data framing scheme or protocol can be employed. Where the multi-frame messaging is utilized, it would have its own error detection or correction encoding of the data contained in the composite message. Any suitable method of error detection or correction for this purpose can be used.

Figure 11:
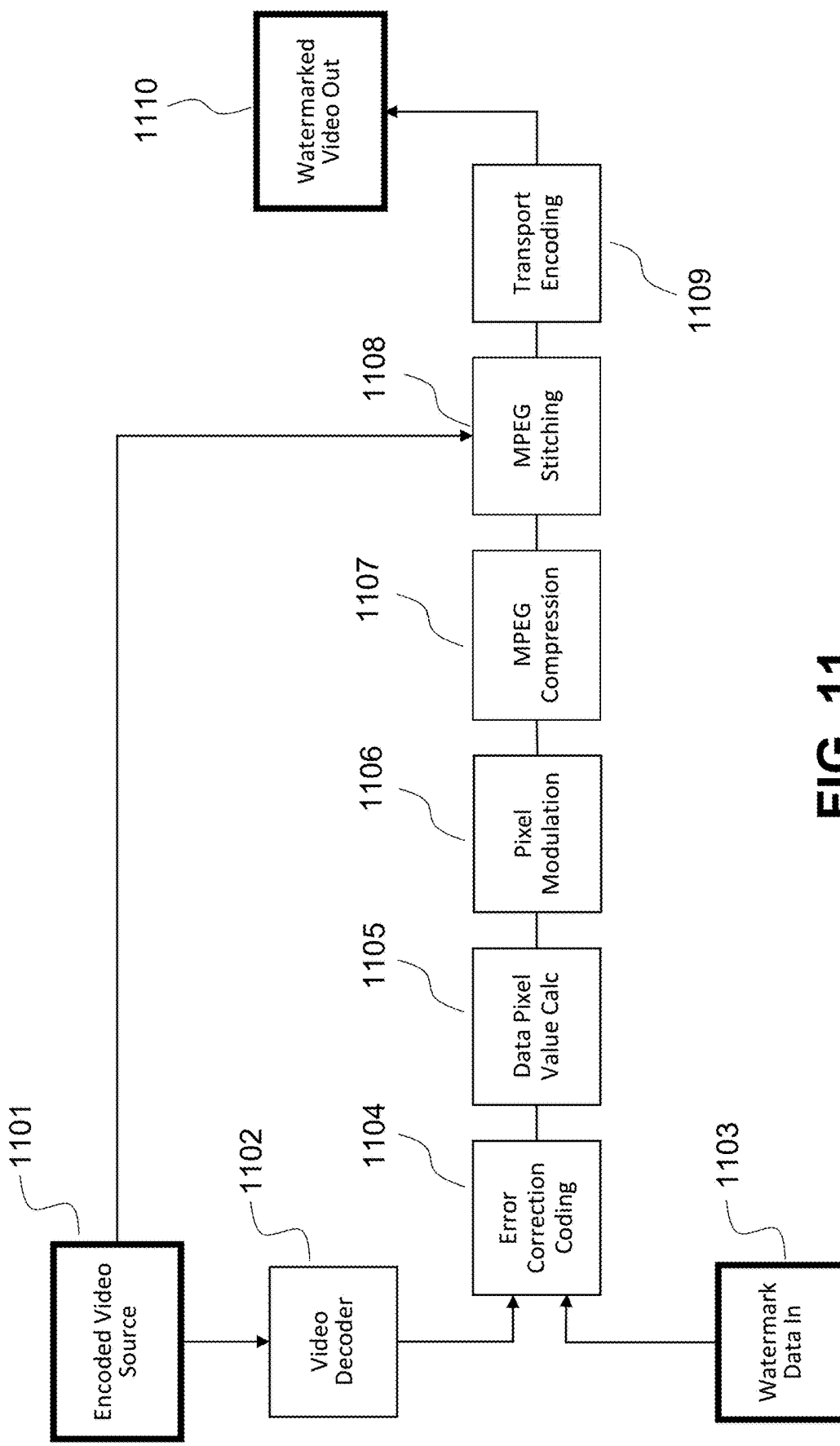
FIG. 11 is an encoding flow diagram illustrating the process of applying a watermark to a video frame, in accordance with some examples provided herein.

FIG. 11 is a diagram illustrating an example of a watermark encoding system. The system receives or obtains encoded video frames from an encoded video source 1101 (e.g., a video headend, a storage device, a cloud server system, a streaming video service provider, or other source of encoded video), and decodes at least a top one or more pixel rows (e.g., the top 16 pixel rows, or other number of pixel rows) of the video frames using a video decoder 1102. In some cases, the bottom one or more pixel lines, a right one or more pixel columns, a left one or more pixel columns, or other subset of pixels from a frame can be extracted and decoded by the video decoder 1102. The encoding system can then receive or obtain watermark data 1103 for a frame. In some cases, error correction codes can be calculated by an error correction coding engine 1104 for the frame or for a sequence of frames of additional watermark data.

A pixel data value calculation engine 1105 can determine pixel data values for encoding the watermark data 1103 into the extracted and decoded top one or more pixel rows of the video frame. The values are determined using the techniques described above (e.g., by modulating the color-difference components of a top one or more lines of the video frame) to minimize visibility within a video frame. A pixel modulation engine 1106 can then modulate the pixel data values onto the Y'CbCr color space representation as explained above, and can apply the pixel data values to the respective pixels of the top one or more pixel rows of the video frame. The one or more pixel rows can be arranged into a video slice, and the slice containing the one or more pixel rows containing the additional watermark data can be re-encoded using any suitable video encoding scheme (e.g., MPEG-2, H.264, H.265, VVC, or the like).

A stitching engine 1108 (e.g., an MPEG stitching engine) can stitch the re-encoded slice layer back into the original encoded video frame. As noted above, in some cases, an intra-frame slice type can be overlaid on the top one or more pixel rows of the video frame regardless of the underlying video frame type (I, B, or P). The resulting composite video material will benefit from having only the top and/or bottom row of pixels (e.g., top and/or bottom row of macroblocks) re-encoded, thus preserving the video quality of the original source material and the top or bottom slice layer that has been embedded with watermark data will have utilized a higher standard of video representation (e.g., 4:2:2 versus 4:2:0) and higher encoding standards (e.g., all macroblocks are encoded as intra-frame video versus bi-directional or predictive frames). By performing the techniques described above, the degradation to the sub-frame area (e.g., the top 16 pixel rows) of the video frame carrying the watermark data will be minimally perceptive to the television viewer.

A transport encoding engine 1109 can prepare (e.g., encode) the video data for transport. At 1110, the watermarked video is output. For example, the video including the additional watermark data can be transmitted for consumption or for further transmission.

Figure 12:
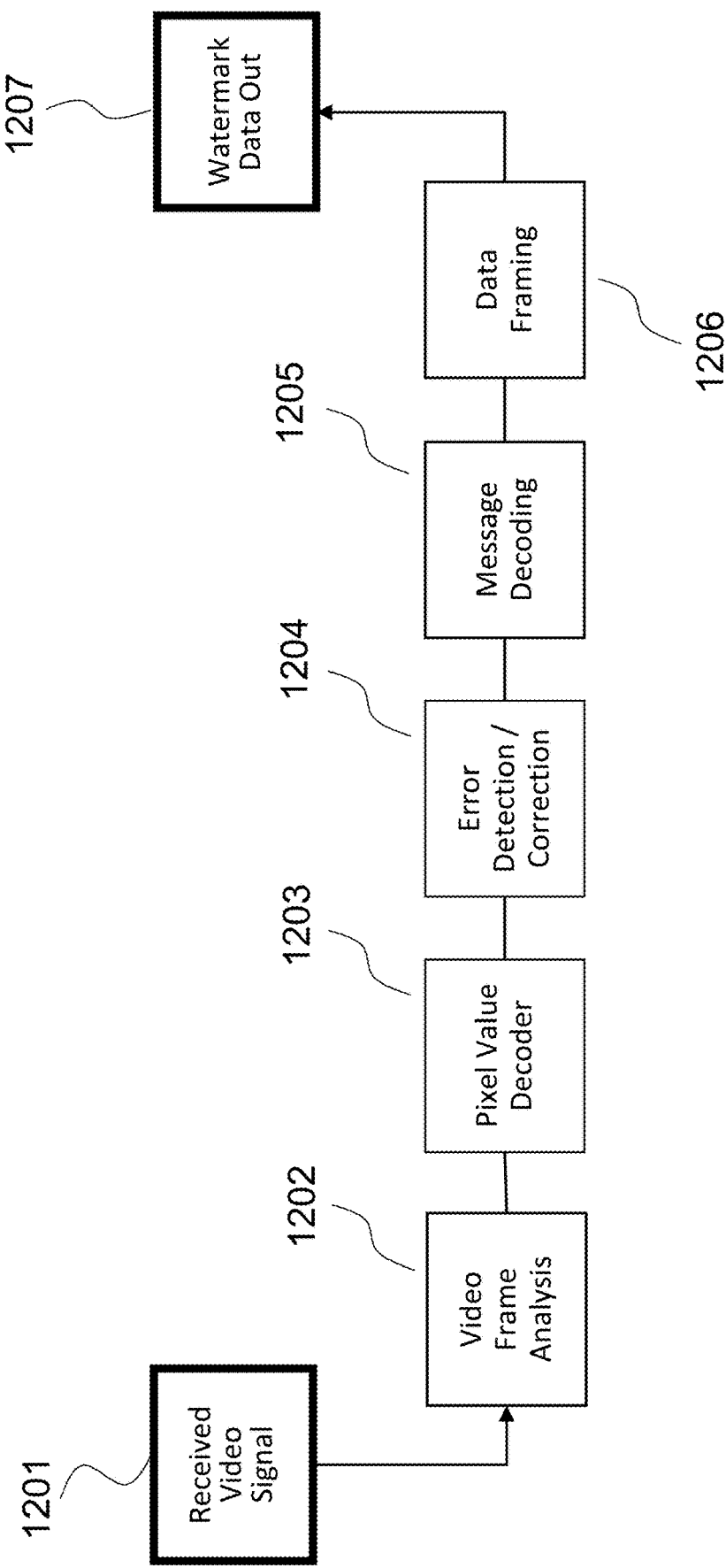
FIG. 12 is a decoding flow diagram illustrating a process of extracting the watermarked data from a video frame, in accordance with some examples provided herein.

FIG. 12 is a diagram illustrating an example of a watermark decoding system. The decoding process performed by the watermark decoding system is designed to be efficient in requiring relative low CPU resources when compared with other means of embedding data in visual images. The decoding process is largely the inverse of the encoding process. A video signal 1201 can be obtained or received (e.g., from a video headend, a storage device, a cloud server system, a streaming video service provider, or other source of encoded video), and a video frame analysis engine 1202 can analyze data in a particular pixel symbol area of a video frame (e.g., the top and/or bottom one or more pixel rows of the video frame, such as the top 16 pixel rows) that is known to contain additional watermark data. The pixel value decoder 1203 can decode the pixel values, and the error detection/correction engine 1204 can perform error detection and/or correction.

A message decoding engine 1205 can perform a detection process to locate the data pixels within a pixel patch area (corresponding to a pixel symbol area). The average value of the pixels within the pixel symbol area is determined and then used to find an area of pixels whose Cb and/or Cr values are measurably different from the adjacent pixel values along a pixel row of video information. For example, the original one or more pixels that are designated to carry the watermark data (e.g., the top one or more pixel rows, such as the extracted one or more pixel rows in the extracted area 202 of FIG. 2) will be altered by the video encoding and decoding processes in the pipeline from the source of the watermarked video to the television receiver that decodes the compressed digital video stream. In some cases, the one or more pixels carrying the watermark data area will be somewhat smeared and will not have crisp boundaries. However, with a plurality of pixels (e.g., eight pixels as shown in FIG. 3A) horizontally representing a binary value and with a higher-quality subsampling format (e.g., a 4:2:2 subsampling format representation), enough information will survive to accurately decode the embedded watermark data. In some cases, at least two rows of pixels can be used for encoding the watermark signal (the additional watermark data) to accommodate video interlacing. A data framing engine 1206 can prepare the video data for output, and at 1207, the watermark data is output.

Using the techniques described herein, watermark data can be applied to a digital video signal in order to embed additional data into the video signal. The watermark data can be easily decoded and processed by a media device in an efficient manner, without adding a large amount of data to the video. Using the above-described techniques, the embedded data conveys information related to the video, triggers a function, and/or allows other uses, while remaining invisible to the viewer of the displayed video.

An illustrative example use of the digital video watermarking techniques described herein can include, by way of example only and without limitation, embedding a digital data code into a video picture (also referred to as a frame) to be used as a signal to a receiving device. In some cases, the digital watermark data can also be used for triggering events (e.g., for interactive television) as well as for dynamic content substitution. For instance, when the data code is received by the receiving device, the data code can cause the receiving device to substitute one video segment for the segment currently being received. The process of substituting one video segment for another can be referred to as dynamic content substitution. Dynamic content substitution can be used in many applications, such as gaming, movies, televisions shows, advertising, or other application. The substation of a certain television advertisement being broadcast as part of a television program with a different advertisement (e.g., one that has been predetermined to be more relevant for that household) can be referred to as dynamic ad insertion. Dynamic content substitution can be dynamic, in which case it will occur any time content that is eligible to be replaced is detected as currently being displayed by means of a process running inside of an enabled receiving device (e.g., a smart TV, set-top box, or other receiving device).

In one example, watermark data can be used at the start of an ad for a vehicle. The watermark data can act as a trigger for a process in a smart TV to substitute alternative content (e.g., a video, an alternative ad, content from the Internet, or other alternative content) based on demographic and/or user data provided to the TV. Alternative content could be stored in the memory of a set-top box, the smart TV, or other device, or could be available over the Internet to be downloaded on demand. For example, alternative content for an automotive brand could be better selected based on the type of vehicle promoted, depending on the demographics or area where the receiving device is located. In such an example, alternative content for compact cars might be sent to urban areas, alternative content for sport utility vehicles or minivans can be sent to suburban neighborhoods, and alternative content for pick-up trucks can be sent to rural locations with a dynamic content system (e.g., a dynamic advertising system) choosing which alternative content message to run by data embedded in the video preceding or at the point of insertion.

Another illustrative example use of the digital video watermarking techniques described herein is that the embedded data can trigger of an on-screen pop-up window, overlay, or other graphical element providing additional information relating to the underlying video content. For instance, additional information can be displayed for a product currently being displayed by the receiving device and/or display device. In some cases, the pop-up window, overlay, or other graphical element can provide a uniform resource locator (URL) link (or other selectable resource) to a website that includes information related to the content being displayed (e.g., a link to a website enabling a user to obtain a product), which can be accessible using a web browser in the receiving device (e.g., a smart TV, a set-top box, or other receiving device). In some examples, the embedded data can trigger the display of a quick response (QR) code on the display device (e.g., on a television monitor) such that a viewer can aim a camera or QR code reader of a mobile device to obtain the QR code data. In some cases, in response to obtaining the QR code data, an Internet browser can be launched on the mobile device, which can access the web address contained in the QR code. There are many other uses in addition to the above for taking advantage of an embedded, invisible watermark in one or more frames of a video stream that can be quickly decoded and hence provides tight synchronization with the video information.

Figure 14:
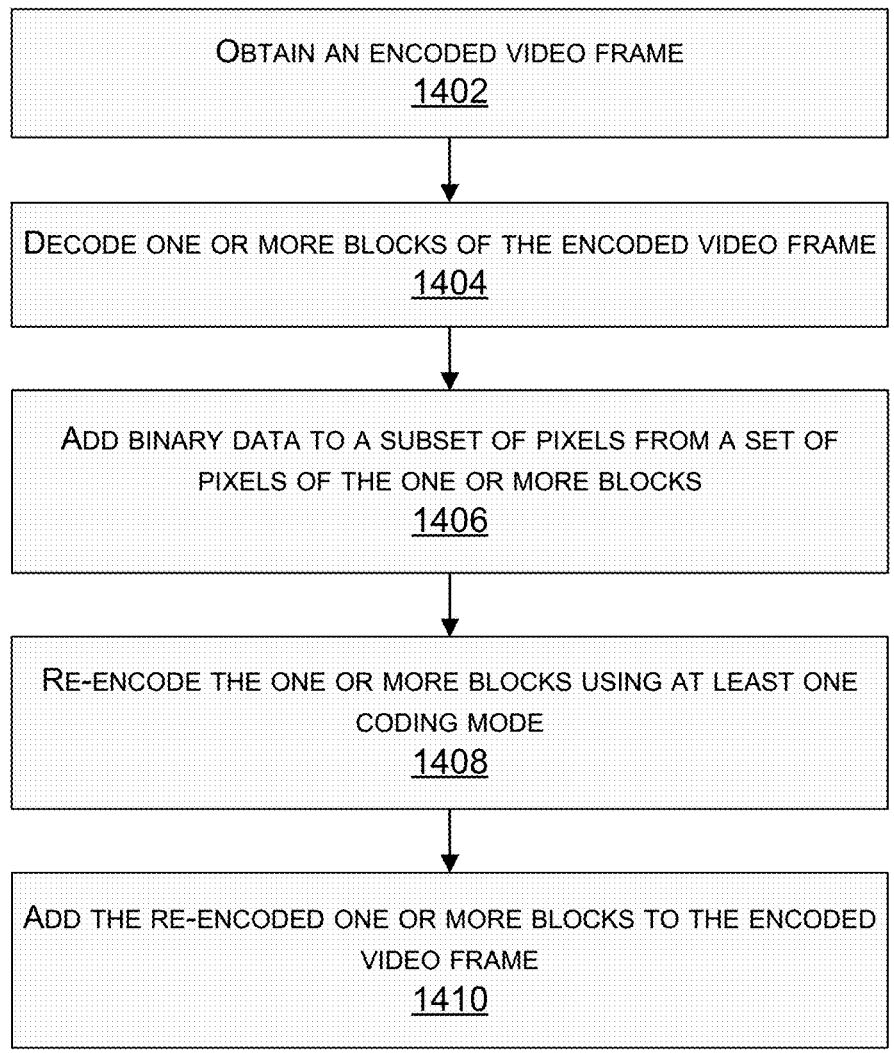
FIG. 14 is a flowchart illustrating an example of a process of processing video data, in accordance with some examples provided herein.

An example of a process performed using the techniques described herein will now be described. FIG. 14 is a flowchart illustrating an example of a process 1400 for processing video data. At block 1402, the process 1400 includes obtaining an encoded video frame. The video frame can be encoded (compressed) using any suitable video coding technique, such as MPEG-2, H.264, H.265, VVC (H.266), or other suitable coding technique.

At block 1404, the process 1400 includes decoding one or more blocks of the encoded video frame. In one illustrative example aspects, the one or more blocks include a top row of blocks of the encoded video frame. The top row of blocks can include one or more pixel rows of the video frame (e.g., the top 16 pixel rows of the video frame 200 shown in FIG. 2, such as the 16 pixel rows 302 shown in FIG. 3A). The top row of blocks can be extracted from the encoded video frame, and then encoded at block 1404.

At block 1406, the process 1400 includes adding binary data to a subset of pixels from a set of pixels of the one or more blocks. In one illustrative example, the subset of pixels of the one or more blocks in which the binary data is added includes at least a top row of pixels of the one or more blocks. In another illustrative example, the subset of pixels of the one or more blocks includes a top two rows of pixels of the one or more blocks (e.g., the top two pixel rows 303 shown in FIG. 3A).

At block 1408, the process 1400 includes re-encoding the one or more blocks using at least one coding mode.

At block 1410, the process 1400 includes adding the re-encoded one or more blocks to the encoded video frame. In some examples, adding the binary data to the subset of pixels of the one or more blocks includes modulating at least one color-difference component of a pixel of the subset of pixels. In some cases, the at least one modulated color-difference component can represent at least one binary value. In some cases, multiple modulated color-difference components can represent a binary value (e.g., the sixteen pixels shown in FIG. 3A, including two rows of eight pixels from the top two pixel rows 303, representing the binary code 304 value of "0"). In some examples, the at least one color-difference component includes a chroma-blue color-difference component and/or a chroma-red color-difference component. In some examples, the luma component of the pixel is not modulated. In some examples, the luma component of the pixel is modulated in addition to the at least one color-difference component. In some examples, the luma component of the pixel is modulated, and a color-difference component is not modulated.

In some implementations, the process 1400 includes modifying a subsampling format of the decoded one or more blocks to increase an amount of chrominance information in the decoded one or more blocks. In some examples, the subsampling format is modified from a 4:2:0 subsampling format to a 4:2:2 subsampling format (e.g., as shown in FIG. 3C). In some examples, the subsampling format is modified from a 4:2:2 subsampling format to a 4:4:4 subsampling format. In some examples, the subsampling format is modified from a 4:1:1 subsampling format to a 4:2:2 subsampling format. In some examples, the subsampling format is modified from a 4:1:1 subsampling format to a 4:2:0 subsampling format.

In some examples, re-encoding the one or more blocks using at least one coding mode includes defining a first coding mode for a top portion of the one or more blocks, and defining a second coding mode for a bottom portion of the one or more blocks. The top portion of the one or more blocks can be encoded using the first coding mode, and the bottom portion of the one or more blocks can be encoded using the second coding mode. For example, the first coding mode can be an intra-prediction coding mode, and the second coding mode can be the originally-defined coding mode for the received encoded video frame. In some cases, the original prediction values of the pixels in the bottom portion can be used when the one or more blocks are re-encoded. In some implementations, a quantization parameter (QP) of the decoded one or more blocks can be modified when re-encoding the one or more blocks (e.g., as shown in FIG. 3C).

In some examples, the process 1400 may be performed by a computing device or apparatus. The computing device can include any suitable device, such as a display device (e.g., a television), a broadcast receiver device, a set-top box, a camera, a personal computer, a mobile device, a tablet computer, a wearable device, or other device. The computing device can include the computing device architecture 1500 shown in FIG. 15. In one example, the process 1400 can be performed by a computing device with the computing device architecture 1500 implementing the watermark encoding system shown in FIG. 11. In some cases, the computing device or apparatus may include an input device, an encoding device, a decoding device, an output device (e.g., a display configured to display the video data such as a decoded version of the encoded video frame, a speaker, and/or other output device), one or more cameras, a processor, microprocessor, microcomputer, and/or other component that is configured to carry out the steps of process 1400. The computing device may further include a display, a network interface configured to communicate and/or receive the data, any combination thereof, and/or other component(s). The network interface may be configured to communicate and/or receive Internet Protocol (IP) based data or other type of data.

Process 1400 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1400 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 15:
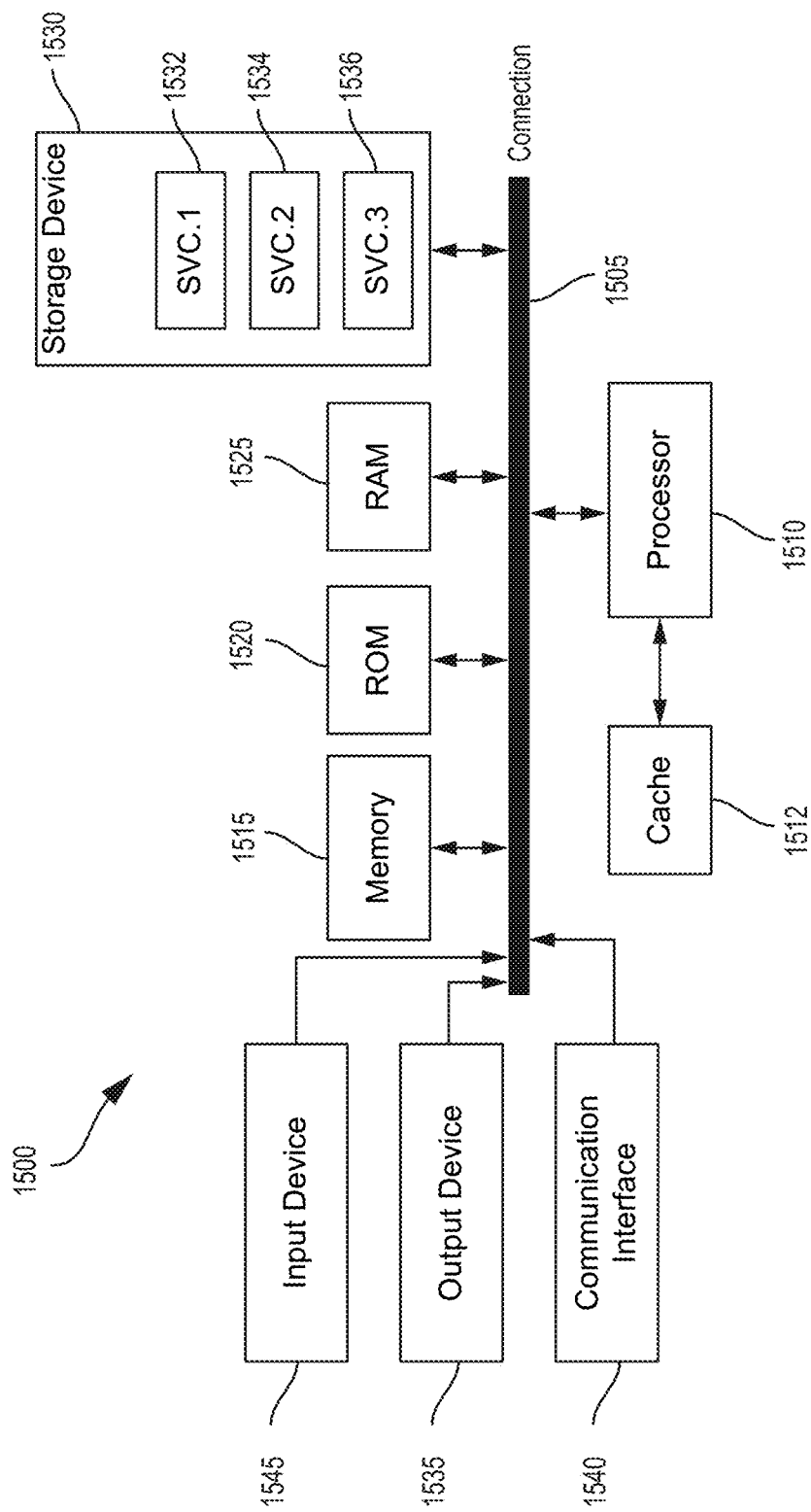
FIG. 15 is an example computing device architecture of an example computing device that can implement the various techniques described herein.

FIG. 15 illustrates an example computing device architecture 1500 of an example computing device which can implement the various techniques described herein. For example, the computing device architecture 1500 can implement the watermark encoding system shown in FIG. 11 and/or the watermark decoding system shown in FIG. 13. The components of computing device architecture 1500 are shown in electrical communication with each other using connection 1505, such as a bus. The example computing device architecture 1500 includes a processing unit (CPU or processor) 1510 and computing device connection 1505 that couples various computing device components including computing device memory 1515, such as read only memory (ROM) 1520 and random access memory (RAM) 1525, to processor 1510.

Computing device architecture 1500 can include a cache of high-speed memory connected directly with, in close proximity to, or integrated as part of processor 1510. Computing device architecture 1500 can copy data from memory 1515 and/or the storage device 1530 to cache 1512 for quick access by processor 1510. In this way, the cache can provide a performance boost that avoids processor 1510 delays while waiting for data. These and other modules can control or be configured to control processor 1510 to perform various actions. Other computing device memory 1515 may be available for use as well. Memory 1515 can include multiple different types of memory with different performance characteristics. Processor 1510 can include any general purpose processor and a hardware or software service, such as service 1 1532, service 2 1534, and service 3 1536 stored in storage device 1530, configured to control processor 1510 as well as a special-purpose processor where software instructions are incorporated into the processor design. Processor 1510 may be a self-contained system, containing multiple cores or processors, a bus, memory controller, cache, etc. A multi-core processor may be symmetric or asymmetric.

To enable user interaction with the computing device architecture 1500, input device 1545 can represent any number of input mechanisms, such as a microphone for speech, a touch-sensitive screen for gesture or graphical input, keyboard, mouse, motion input, speech and so forth. Output device 1535 can also be one or more of a number of output mechanisms known to those of skill in the art, such as a display, projector, television, speaker device, etc. In some instances, multimodal computing devices can enable a user to provide multiple types of input to communicate with computing device architecture 1500. Communications interface 1540 can generally govern and manage the user input and computing device output. There is no restriction on operating on any particular hardware arrangement and therefore the basic features here may easily be substituted for improved hardware or firmware arrangements as they are developed.

Storage device 1530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1525, read only memory (ROM) 1520, and hybrids thereof. Storage device 1530 can include services 1532, 1534, 1536 for controlling processor 1510. Other hardware or software modules are contemplated. Storage device 1530 can be connected to the computing device connection 1505. In one aspect, a hardware module that performs a particular function can include the software component stored in a computer-readable medium in connection with the necessary hardware components, such as processor 1510, connection 1505, output device 1535, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set indicates that one member of the set or multiple members of the set satisfy the claim. For example, claim language reciting "at least one of A and B" means A, B, or A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method comprising:
    detecting, in a video frame, a watermark based on pixel values of pixels of a first set of pixels, the first set of pixels corresponding to a first region of the video frame, wherein the detected watermark comprises data that was encoded based on modifications to luminance and/or chrominance values of pixels;
    identifying, within the first set of pixels, one or more subsets of pixels that correspond to a first pixel value and one or more subsets of pixels that correspond to a second pixel value;
    assigning a first symbol to the one or more subsets of pixels that correspond to the first pixel value and a second symbol to the one or more subsets of pixels that correspond to the second pixel value; and
    generating, based on the first symbol and the second symbol, a first sequence of symbols corresponding to the data.

2. The method of claim 1, wherein the first region of the video frame includes a top row of the video frame.

3. The method of claim 1, further comprising:
    replacing, based on the first sequence of symbols, a video frame to be displayed with a replacement video frame.

4. The method of claim 3, wherein the replacement video frame is stored in local memory.

5. The method of claim 1, further comprising:
    displaying, in response to decoding the first sequence of symbols, a graphical user interface over the video frame.

6. The method of claim 5, wherein the graphical user interface includes video information associated with content of the video frame.

7. A system comprising:
one or more processors; and
a non-transitory computer-readable medium storing instructions that, when executed by the one or more processors, cause the one or more processors to perform operations including:
  detecting, in a video frame, a watermark based on pixel values of pixels of a first set of pixels, the first set of pixels corresponding to a first region of the video frame, wherein the detected watermark comprises data that was encoded based on modifications to luminance and/or chrominance values of pixels;
  identifying, within the first set of pixels, one or more subsets of pixels that correspond to a first pixel value and one or more subsets of pixels that correspond to a second pixel value;
  assigning a first symbol to the one or more subsets of pixels that correspond to the first pixel value and a second symbol to the one or more subsets of pixels that correspond to the second pixel value; and
  generating, based on the first symbol and the second symbol, a first sequence of symbols corresponding to the data.

8. The system of claim 7, wherein the first region of the video frame includes a top row of the video frame.

9. The system of claim 7, wherein the operations further include:
replacing, based on the first sequence of symbols, a video frame to be displayed with a replacement video frame.

10. The system of claim 9, wherein the replacement video frame is stored in local memory.

11. The system of claim 7, wherein the operations further include:
displaying, in response to decoding the first sequence of symbols, a graphical user interface over the video frame.

12. The system of claim 11, wherein the graphical user interface includes video information associated with content of the video frame.

13. A non-transitory computer-readable medium storing instructions that, when executed by one or more processors, cause the one or more processors to perform operations including:
  detecting, in a video frame, a watermark based on pixel values of pixels of a first set of pixels, the first set of pixels corresponding to a first region of the video frame, wherein the detected watermark comprises data that was encoded based on modifications to luminance and/or chrominance values of pixels;
  identifying, within the first set of pixels, one or more subsets of pixels that correspond to a first pixel value and one or more subsets of pixels that correspond to a second pixel value;
  assigning a first symbol to the one or more subsets of pixels that correspond to the first pixel value and a second symbol to the one or more subsets of pixels that correspond to the second pixel value; and
  generating, based on the first symbol and the second symbol, a first sequence of symbols corresponding to the data.

14. The non-transitory computer-readable medium of claim 13, wherein the first region of the video frame includes a top row of the video frame.

15. The non-transitory computer-readable medium of claim 13, wherein the operations further include:
replacing, based on the first sequence of symbols, a video frame to be displayed with a replacement video frame.

16. The non-transitory computer-readable medium of claim 15, wherein the replacement video frame is stored in local memory.

17. The non-transitory computer-readable medium of claim 13, wherein the operations further include:
displaying, in response to decoding the first sequence of symbols, a graphical user interface over the video frame.

18. The method of claim 1, further comprising:
generating, based on symbols assigned to one or more subsets of pixels of a second region, a second sequence of symbols, the second region being a different region of the video frame from the first region; and
modifying the first sequence of symbols to include the second sequence of symbols.

19. The system of claim 7, wherein the instructions further comprise:
generating, based on symbols assigned to one or more subsets of pixels of a second region, a second sequence of symbols, the second region being a different region of the video frame from the first region; and
modifying the first sequence of symbols to include the second sequence of symbols.

20. The non-transitory computer-readable medium of claim 13, wherein the instructions further comprise:
generating, based on symbols assigned to one or more subsets of pixels of a second region, a second sequence of symbols, the second region being a different region of the video frame from the first region; and
modifying the first sequence of symbols to include the second sequence of symbols.

* * * * *